US011620913B2

(12) United States Patent
Thiercelin et al.

(10) Patent No.: US 11,620,913 B2
(45) Date of Patent: Apr. 4, 2023

(54) MOVABLE OBJECT APPLICATION FRAMEWORK

(71) Applicant: DJI Technology, Inc., Burbank, CA (US)

(72) Inventors: Arnaud Thiercelin, San Francisco, CA (US); Rohit Sant, Palo Alto, CA (US)

(73) Assignee: DJI Technology, Inc., Burbank, CA (US)

( * ) Notice: Subject to any disclaimer, the term of this patent is extended or adjusted under 35 U.S.C. 154(b) by 118 days.

(21) Appl. No.: 16/669,350

(22) Filed: Oct. 30, 2019

(65) Prior Publication Data

US 2020/0066168 A1 Feb. 27, 2020

Related U.S. Application Data

(63) Continuation of application No. PCT/US2017/050338, filed on Sep. 6, 2017.

(51) Int. Cl.
*G08G 5/00* (2006.01)
*B64C 39/02* (2023.01)
(Continued)

(52) U.S. Cl.
CPC ......... *G08G 5/0069* (2013.01); *B64C 39/024* (2013.01); *G05D 1/0022* (2013.01);
(Continued)

(58) Field of Classification Search
CPC ............. G08G 5/0069; B64C 39/024; B64C 2201/141; G05D 1/0022; G05D 1/0088; G05D 1/101

See application file for complete search history.

(56) References Cited

U.S. PATENT DOCUMENTS 7,307,999 B1 * 12/2007 Donaghey ........... H04L 63/0227
370/389
2010/0073363 A1 3/2010 Densham et al.
(Continued)

FOREIGN PATENT DOCUMENTS

CN 101953172 A 1/2011
CN 106330997 A 1/2017

OTHER PUBLICATIONS

International Search Report and Written Opinion for related International Patent Application No. PCT/US2017/050338, dated Jan. 11, 2018, 10 pages.

*Primary Examiner* — Peter D Nolan
*Assistant Examiner* — Roy Rhee
(74) *Attorney, Agent, or Firm* — Nicholson De Vos Webster & Elliott LLP

(57) ABSTRACT

Techniques are disclosed for communicating between a client device and an onboard data manager in a movable object environment. A data manager on a user device can identify an onboard data manager on a movable object. A feature list can be received from the onboard data manager, the feature list identifying at least one feature installed to the movable object. At least one input can be received by the user device, and a user device feature corresponding to the at least one input can be determined. It may be further determined that the user device feature is supported by the onboard data manager based on the feature list. In response to determining that the user device feature is supported, a first instruction corresponding to the at least one input can be sent to the movable object including the onboard data manager.

21 Claims, 17 Drawing Sheets

(51) Int. Cl.
*G05D 1/00* (2006.01)
*G05D 1/10* (2006.01)

(52) U.S. Cl.
CPC ........... *G05D 1/0088* (2013.01); *G05D 1/101* (2013.01); *B64C 2201/141* (2013.01)

(56) References Cited

U.S. PATENT DOCUMENTS

| | | |
|---|---|---|
| 2015/0190927 A1 | 7/2015 | Sutherland et al. |
| 2015/0344136 A1 | 12/2015 | Dahlstrom |
| 2015/0362917 A1* | 12/2015 | Wang .................. G05D 1/0022 701/2 |
| 2016/0139595 A1 | 5/2016 | Yang et al. |
| 2016/0306355 A1 | 10/2016 | Gordon et al. |
| 2016/0357183 A1 | 12/2016 | Shaw |
| 2017/0064068 A1 | 3/2017 | Liu et al. |
| 2017/0076194 A1 | 3/2017 | Versace et al. |
| 2017/0134699 A1* | 5/2017 | Kim .................... B64C 39/024 |
| 2017/0201746 A1* | 7/2017 | An ...................... H04N 17/002 |
| 2018/0300123 A1* | 10/2018 | Willis ................... H04L 67/12 |

\* cited by examiner

MOVABLE OBJECT APPLICATION FRAMEWORK

CROSS-REFERENCE TO RELATED APPLICATIONS

This application is a continuation of PCT Application No. PCT/US2017/050338, filed Sep. 6, 2017, which is hereby incorporated by reference in its entirety for all purposes.

FIELD OF THE INVENTION

The disclosed embodiments relate generally to techniques for customizing graphical user interfaces in a movable object environment and more particularly, but not exclusively, to a movable object application framework.

BACKGROUND

Aerial vehicles such as unmanned aerial vehicles (UAVs) can be used for performing surveillance, reconnaissance, and exploration tasks for various applications. Traditionally, UAVs are controlled by remote control and a connected device, such as a mobile device. This setup enables the mobile device to capture the user's intent (e.g., fly in a given direction, hover, etc.) but introduces several limitations. Communication between the UAV and the remote control is typically wireless, which introduces latency and is limited by local interference. This setup is also not extendable. Instead, the functionality is limited by the commands that can be sent to the UAV. For example, the flight controller on the UAV may only accept particular, predefined commands and extending this command set may be difficult or impossible for end users. Similarly, the end user may not be able to add sensors to the UAV, as the flight controller and mobile device are not configurable to support the new sensor.

SUMMARY

Techniques are disclosed for communicating between a client device and an onboard data manager in a movable object environment. A data manager on a user device can identify an onboard data manager on a movable object. A feature list can be received from the onboard data manager, the feature list including at least one feature installed to the movable object. At least one input can be received by the user device, and the user device manager can determine a user device feature corresponding to the at least one input. The user device feature can be compared to the feature list and, based on the comparison, the user device manager can determine that a first instruction corresponding to the at least one input is to be processed by the onboard data manager. The first instruction can then be sent to the movable object including the onboard data manager for processing.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The following description of the invention describes client device and onboard data management for a movable object. For simplicity of explanation, an unmanned aerial vehicle (UAV) is generally used as example of a movable object. It will be apparent to those skilled in the art that other types of movable objects can be used without limitation.

Figure 1:
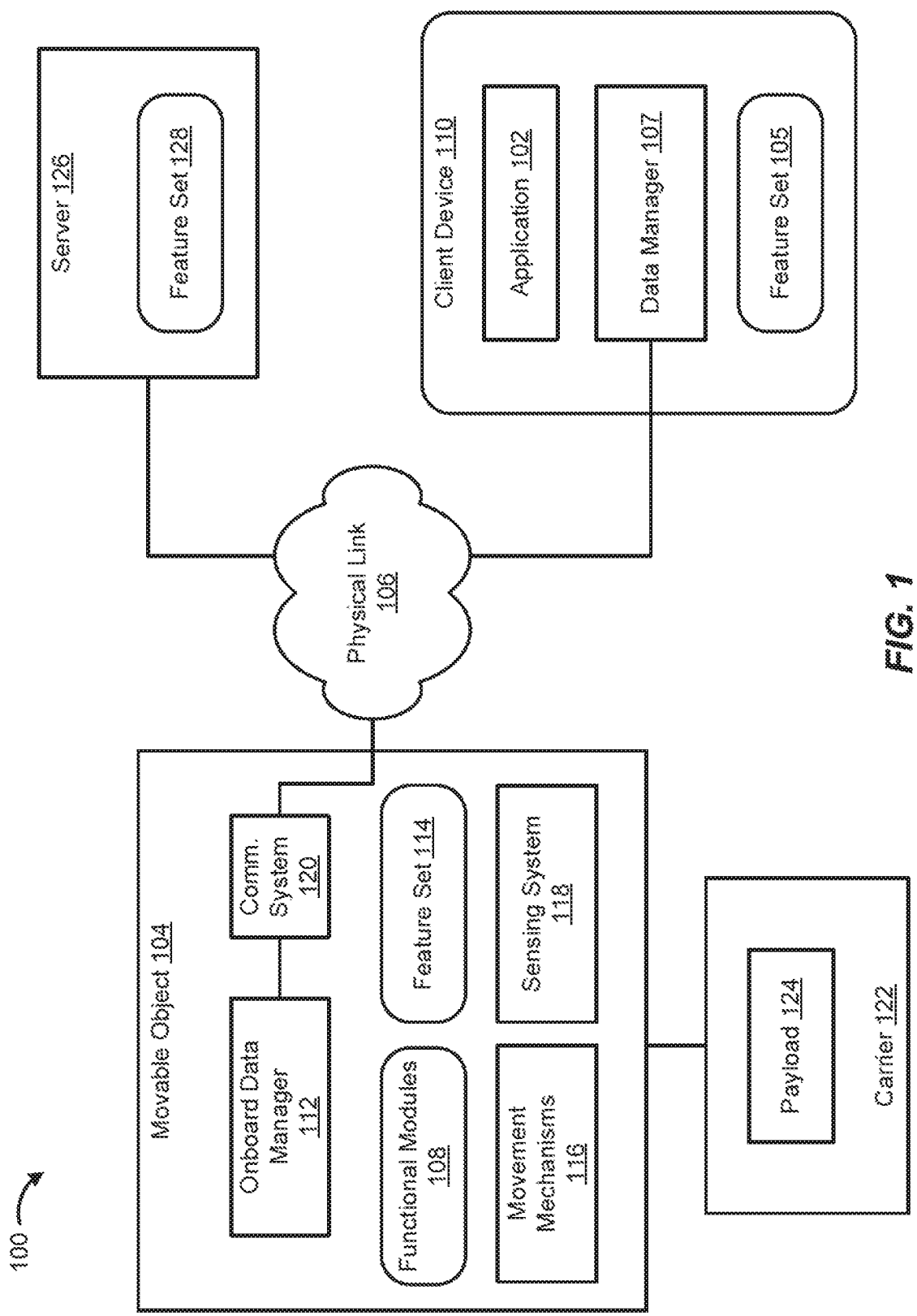
FIG. 1 illustrates an example of an application in a movable object environment, in accordance with various embodiments of the present invention.

FIG. 1 illustrates an example of an application in a movable object environment 100, in accordance with various embodiments of the present invention. As shown in FIG. 1, an application 102 in a movable object environment 100 can communicate with a movable object 104 via a physical link 106. The movable object 104 can be an unmanned aircraft, an unmanned vehicle, a handheld device, and/or a robot.

As shown in the example of FIG. 1, this communication may be facilitated using client side data manager 107 (also referred to as a device data manager, mobile data manager, or data manager) and an onboard data manager 112. Application 102 may receive input (e.g., from a user, other movable object, other computer system, etc.) indicating one or more actions to be performed by the movable object. The data manager may determine one or more instructions to be sent to the onboard data manager to cause the movable object 104 to perform the indicated one or more actions. In some embodiments, when data manager 107 establishes a communication connection with movable object 104, data manager 107 may request information related to the onboard data manager 112 and the capabilities of movable object 104. For example, the movable object 104 can include various functional modules 108. For example, an unmanned aircraft can include a camera module, a battery module, a gimbal module, a communication module, and a flight controller module, etc. The movable object may also include a feature set 114 indicating one or more actions available to be performed by movable object 104. The data manager 107 may compare the received feature set 114 from the movable object 104 to its own feature set 105 to determine which actions are available. For example, features included in feature set 105 but missing from feature set 114 (or likewise included in feature set 114 but missing from feature set 105) may not be performed. In such cases, feature set 105 or feature set 114 may be updated with the missing feature(s) from feature set 128 on server 126. In some embodiments, server 126 may communicate with the client device 110 and/or the movable object 104 over physical link 106.

As shown in FIG. 1, the movable object 104, client device 110, and/or server 126 may each include a feature set. In various embodiments, this may comprise executable instructions for implementing one or more features in the feature set, such as a software or hardware driver, instructions to cause the movable object to perform an action etc. In some embodiments, features from a feature set may be used by an application to perform a particular function (e.g., a corresponding action, or access a corresponding hardware component) without requiring the application developer to implement that function. In this way, a feature set may serve as a library that may be used by an application during execution. An application may use one or more features from the feature set, and different applications may each make use of the same or different features from the feature set. For example, an object tracking application may use a computer vision feature to identify the object to be tracked.

As shown in FIG. 1, the application 102 can be deployed on a client device 110. For example, the client device 110 can be a portable personal computing device, a smart phone, a remote control, a wearable computer, virtual reality/augmented reality system, and/or a personal computer. Additionally, the client device 110 can include a communication device (not shown), which is responsible for handling the communication between the application 102 on the client device 110 and various modules 108 on the movable object 104. For example, an unmanned aircraft can include uplink and downlink. The uplink can be used for transmitting control signals, the down link can be used for transmitting media or video stream. As discussed further, client device 110 and movable object 104 may each include a communications router which determines how to route data received over the physical link 106, e.g., based on data, contents, protocol, etc.

In accordance with various embodiments of the present invention, the physical link 106 can be (part of) a network, which is based on various wireless technologies, such as the WiFi, Bluetooth, 3G/4G, and other radio frequency technologies. Furthermore, the physical link 106 can be based on other computer network technologies, such as the internet technology, or any other wired or wireless networking technology. In some embodiments, the physical link 106 may be a non-network technology, including direct point-to-point connections such as universal serial bus (USB) or universal asynchronous receiver-transmitter (UART).

In various embodiments, movable object 104 in a movable object environment 100 can include a carrier and a payload. Although the movable object 104 is described generally as an aircraft, this is not intended to be limiting, and any suitable type of movable object can be used. One of skill in the art would appreciate that any of the embodiments described herein in the context of aircraft systems can be applied to any suitable movable object (e.g., a UAV). In some instances, the payload may be provided on the movable object 104 without requiring the carrier.

In accordance with various embodiments of the present invention, the movable object 104 may include one or more movement mechanisms 116 (e.g. propulsion mechanisms), a sensing system 118, and a communication system 120. The movement mechanisms 116 can include one or more of rotors, propellers, blades, engines, motors, wheels, axles, magnets, nozzles, animals, or human beings. For example, the movable object may have one or more propulsion mechanisms. The movement mechanisms may all be of the same type. Alternatively, the movement mechanisms can be different types of movement mechanisms. The movement mechanisms 116 can be mounted on the movable object 104 (or vice-versa), using any suitable means such as a support element (e.g., a drive shaft). The movement mechanisms 116 can be mounted on any suitable portion of the movable object 104, such on the top, bottom, front, back, sides, or suitable combinations thereof.

In some embodiments, the movement mechanisms 116 can enable the movable object 104 to take off vertically from a surface or land vertically on a surface without requiring any horizontal movement of the movable object 104 (e.g., without traveling down a runway). Optionally, the movement mechanisms 116 can be operable to permit the movable object 116 to hover in the air at a specified position and/or orientation. One or more of the movement mechanisms 104 may be controlled independently of the other movement mechanisms, for example by application 102. Alternatively, the movement mechanisms 116 can be configured to be controlled simultaneously. For example, the movable object 104 can have multiple horizontally oriented rotors that can provide lift and/or thrust to the movable object. The multiple horizontally oriented rotors can be actuated to provide vertical takeoff, vertical landing, and hovering capabilities to the movable object 104. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 104 (e.g., with respect to up to three degrees of translation and up to three degrees of rotation).

The sensing system 118 can include one or more sensors that may sense the spatial disposition, velocity, and/or acceleration of the movable object 104 (e.g., with respect to various degrees of translation and various degrees of rotation). The one or more sensors can include any of the sensors, including GPS sensors, motion sensors, inertial sensors, proximity sensors, or image sensors. The sensing data provided by the sensing system 118 can be used to control the spatial disposition, velocity, and/or orientation of the movable object 104 (e.g., using a suitable processing unit and/or control module). Alternatively, the sensing system 118 can be used to provide data regarding the environment surrounding the movable object, such as weather conditions, proximity to potential obstacles, location of geographical features, location of manmade structures, and the like.

The communication system 120 enables communication with application 102 executing on client device 110 via physical link 106, which may include various wired and/or wireless technologies as discussed above. The communication system 120 may include any number of transmitters, receivers, and/or transceivers suitable for wireless communication. The communication may be one-way communication, such that data can be transmitted in only one direction. For example, one-way communication may involve only the movable object 104 transmitting data to the application 102, or vice-versa. The data may be transmitted from one or more transmitters of the communication system 110 to one or more receivers of the client device, or vice-versa. Alternatively, the communication may be two-way communication, such that data can be transmitted in both directions between the movable object 104 and the client device 102. The two-way communication can involve transmitting data from one or more transmitters of the communication system 120 to one or more receivers of the client device 110, and vice-versa.

In some embodiments, the application 102 can provide control data to one or more of the movable object 104, carrier 122, and payload 124 and receive information from one or more of the movable object 104, carrier 122, and payload 124 (e.g., position and/or motion information of the movable object, carrier or payload; data sensed by the payload such as image data captured by a payload camera; and data generated from image data captured by the payload camera). In some instances, control data from the application may include instructions for relative positions, movements, actuations, or controls of the movable object, carrier, and/or payload. For example, the control data may result in a modification of the location and/or orientation of the movable object (e.g., via control of the movement mechanisms 116), or a movement of the payload with respect to the movable object (e.g., via control of the carrier 122). The control data from the application may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). Although embodiments may be described that include a camera or other image capture device as payload, any payload may be used with embodiments of the present invention. In some embodiments, application 102 may be configured to control a particular payload.

In some instances, the communications from the movable object, carrier and/or payload may include information from one or more sensors (e.g., of the sensing system 118 or of the payload 124) and/or data generated based on the sensing information. The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload.

Figure 2:
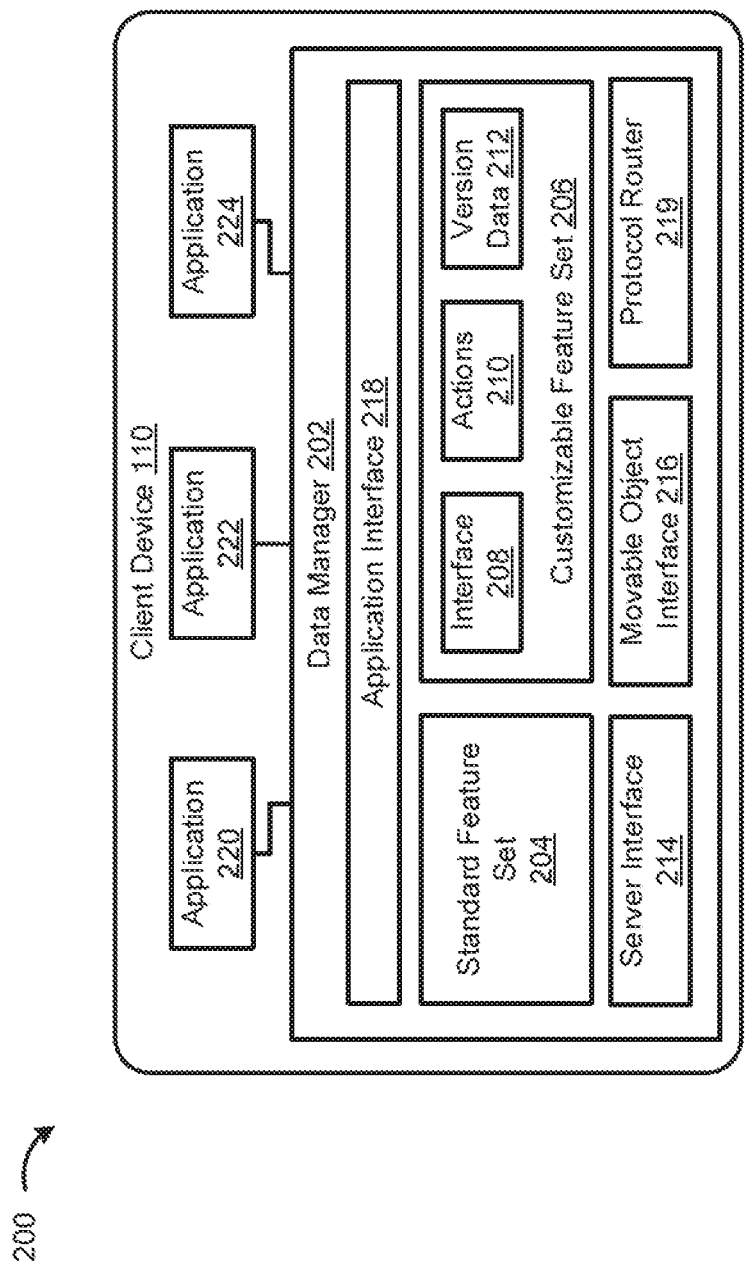
FIG. 2 illustrates an example of a data manager in a movable object environment, in accordance with various embodiments of the present invention.

FIG. 2 illustrates an example of a data manager in a movable object environment 200, in accordance with various embodiments of the present invention. Client device 110 can include a desktop or laptop computer, tablet computer, smartphone or other mobile device, wearable computer, virtual reality system, or other client device. Client device 110 can include a data manager 202. Data manager 202 can execute on one or more processors, field programmable gate arrays, application specific integrated circuits, or other processing devices in client device 110. Although the embodiment shown in FIG. 2 shows data manager 202 deployed to client device 110, in some embodiments, data manager 202 can be deployed to one or more servers and manage communication for multiple client devices remotely. In some embodiments data manager 202 can be part of a software development kit (SDK), or mobile SDK, which is used for supporting the development of software applications in the movable object environment 200. Data manager 202 can include several interfaces to communicate with other systems in the movable object environment. For example, server interface 214 can facilitate communication with a server, such as server 126. Server interface 214 can enable the data manager 202 to obtain feature set data, including action data and sensor data, and/or to instruct the server to provide feature set data to one or more movable objects. In some embodiments, server interface 214 can communicate with one or more applications executing on a server, such as an object storage service, database, application (e.g., app) store, or other application or service. Data manager 202 may also include a movable object interface 216, which can facilitate communication with one or more movable objects. As discussed, movable object interface 216 may facilitate communication with an onboard data manager executing on a movable object. In some embodiments, data manager 202 can also include an application interface 218 which can enable various applications 220, 222, 224, to communicate with one or more servers and/or movable objects through data manager 202. Although three applications are shown, embodiments may support more or fewer applications. In some embodiments, a protocol router 217 can route data as it received through any of the interfaces included in data manager 202. Routing may be performed based on the data or metadata received, protocol, contents, or other communication characteristics.

As shown, data manager 202 can include a standard feature set 204 and a customizable feature set 206. Although these feature sets are shown as distinct sets, this is for simplicity of explanation only, in various embodiments all available features may be included in a single feature set, or any other feature organization. As used herein, features may refer to actions 210, interfaces 208, and/or other functions which may be accessed, instructed, or otherwise utilized by applications 220, 222, 224, and/or movable objects. In some embodiments, hardware interface 208 may include a sensor interface, payload interface, or other hardware component interface. For example, a client-side sensor interface may be used to interface with a corresponding sensor interface on the movable object to access the corresponding sensor (e.g., to provide control or configuration data, to receive sensor data, etc.). A given feature may include a client-side feature portion installed to client device 110 and a movable object-side feature portion installed to a movable object. These client-side and movable object-side feature portions may include software and/or hardware drivers, license data, or other software/hardware that enables the features to be utilized. In various embodiments, version data 212 may be maintained for the data manager 202 and/or each feature in the standard feature set 204 and/or customizable feature set 206. Similarly, in some embodiments, a client-side action may invoke one or more actions to be performed by the movable object. The client-side action may collect input data from the user (e.g., waypoints, control data such as an acceleration profile to perform between waypoints or path data to determine a curved path between waypoints). The client-side action may provide this input data to the onboard action through an application programming interface (API) associated with the onboard action.

In some embodiments, the client device 110 may receive a feature list from a movable object, the feature list may identify those features which the movable object currently supports (e.g., actions, hardware components, or other functions which have been installed or enabled on the movable object). The feature list may identify features using an identifier and/or version data associated with the features. In some embodiments, the client device 110 may connect to multiple movable objects and receive multiple corresponding feature lists at the same time or at different points in time. Each feature list may be indexed by an identifier associated with the onboard data manager/movable object. In some embodiments, when the client device reconnects (or periodically after reconnection) to one of these movable objects, the client device may request an updated feature list.

Figure 3:
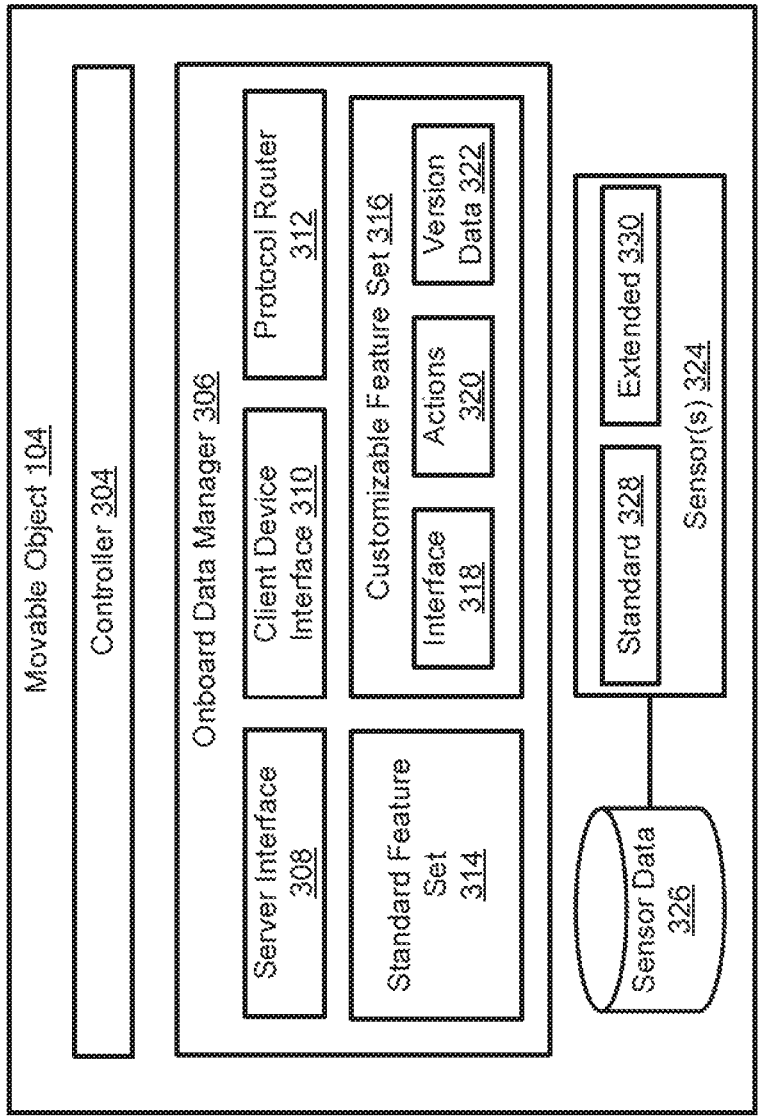
FIG. 3 illustrates an example of an onboard data manager in a movable object environment, in accordance with various embodiments of the present invention.

FIG. 3 illustrates an example of an onboard data manager in a movable object environment 300, in accordance with various embodiments of the present invention. A movable object 104 may include an unmanned aircraft, an unmanned vehicle, a handheld device, and/or a robot. Movable object 104 can include a controller 304, such as a flight controller, that can control the navigation of the movable object and limit the movement of the movable object based on geofencing data (e.g., access data) received from an access manager through a location manager. Movable object 104 may also include one or more sensors 324, which may be controlled through an onboard sensor interface 318 which may receive control data from a corresponding client-side sensor interface to produce sensor data 326. As noted above, the one or more sensors 324 can include any sensors, including GPS sensors, motion sensors, inertial sensors, proximity sensors, or image sensors. The sensor data 326 can be used to control the spatial disposition, velocity, and/or orientation of the movable object 104. In some embodiments, sensors 324 may collect state information about the movable object 104, such as battery level, signal strength (e.g., remote control signal strength, video signal strength, GPS signal strength, etc.), and other information. Additionally, or alternatively, sensors 206 can collect data regarding the environment surrounding the movable object 202, such as weather conditions, proximity to potential obstacles, location of geographical features, location of manmade structures, and the like.

In various embodiments, sensors 324 may include standard sensors 328, which may correspond to the sensors discussed above. Additionally, sensors 324 can be extended by adding new sensors and/or new sensor drivers to enable extended sensors 330. These may include application-specific sensors added to perform a specific task. For example, a range finder sensor, LiDAR sensor, or other sensor hardware may be added to movable object 104. A corresponding hardware and/or software driver sensor 318 may be configured in onboard data manager 306 to enable use of the new sensor. Similarly, features of the sensor hardware already installed may be enabled or disabled by updating the hardware and/or software sensor 318.

Movable object 104 can also include an onboard data manager 306. Onboard data manager 306 can execute on one or more processors, field programmable gate arrays, application specific integrated circuits, or other processing devices in movable object 104. Onboard data manager 306 can include several interfaces to communicate with other systems in the movable object environment. For example, server interface 308 can facilitate communication with a server, such as server 126, in response to an instruction from a movable object. Server interface 308 can enable the onboard data manager 306 to obtain feature set data, including data about the requested feature and/or hardware drivers such as sensor drivers, from the server in response to an instruction from a movable object. As discussed, in some embodiments, server interface 308 can communicate with one or more applications executing on a server, such as an object storage service, database, application (e.g., app) store, or other application or service. Onboard data manager 306 may also include a client device interface 310, which can facilitate communication with one or more client devices. As discussed, client device interface 310 may facilitate communication with a data manager executing on a client device. In some embodiments, a protocol router 312 can route data as it received through any of the interfaces included in onboard data manager 306. Routing may be performed based on the data or metadata received, protocol, contents, or other communication characteristics.

In some embodiments, movable object 104 may communicate with other movable objects through server interface 308. A client device may provide instructions to a first movable object, these instructions may further include instructions to be passed to another movable object. For example, in an inspection application, multiple movable objects may be utilized to perform the inspection, where each movable object takes over the inspection from a prior movable object. When one movable object's battery level is low (or other condition which requires the movable object to stop performing the inspection), the movable object can instruct the next movable object to perform the inspection and provide data indicating where in the inspection the new movable object is to start.

As shown, onboard data manager 306 can include a standard feature set 314 and a customizable feature set 316. Although these feature sets are shown as distinct sets, this is for simplicity of explanation only, in various embodiments all available features may be included in a single feature set, or any other feature organization. As used herein, features may refer to actions 320 and/or interface 318 which may be accessed, instructed, or otherwise utilized by one or more client devices. In some embodiments, hardware interface 318 may include a sensor interface, payload interface, or other hardware component interface which may communicate with a corresponding client-side sensor interface to provide access to the corresponding hardware component (e.g., to receive control or configuration data, to provide data, etc.). A given feature may include a client-side feature installed to client device and a movable object-side feature installed to a movable object 104. These client-side and movable object-side features 314, 316 may include software and/or hardware drivers, license data, or other software/hardware that enables the features to be utilized. In various embodiments, version data 322 may be maintained for the onboard data manager 306 and/or each feature in the standard feature set 314 and/or customizable feature set 316.

Figure 4:
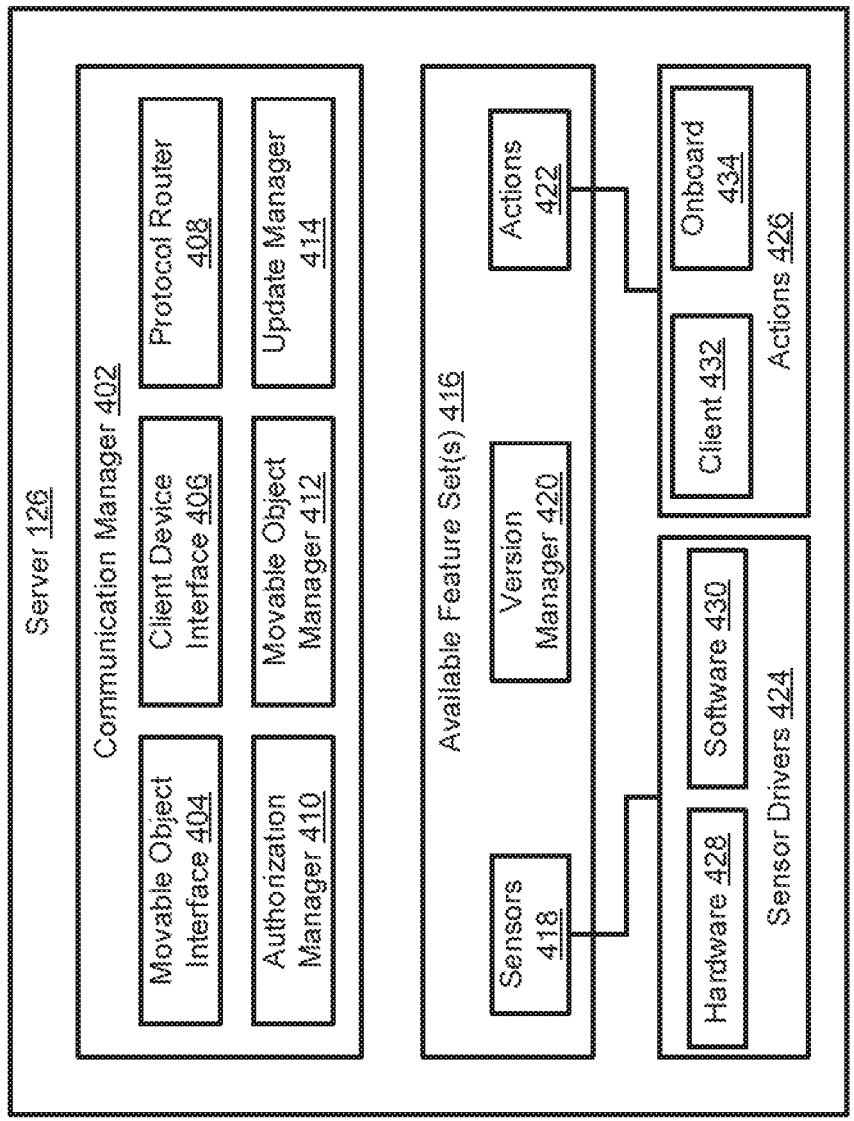
FIG. 4 illustrates an example of a feature server in a movable object environment, in accordance with various embodiments of the present invention.

FIG. 4 illustrates an example of a feature server in a movable object environment 400, in accordance with various embodiments of the present invention. In some embodiments, examples of a feature server may include an app store, a ground station, or other computing device configured to provide data about features and/or hardware component drivers. For example, a feature server may include any suitable storage device (e.g., a USB drive, a cloud storage provider, wireless transmission, etc.). As shown in FIG. 4, server 126 can include a communication manager 402. Server 126, may be any network accessible server computer which may include one or more processors, field programmable gate arrays, application specific integrated circuits, or other processing devices. Communication manager 402 can include several interfaces to communicate with other systems in the movable object environment. For example, movable object interface 404 and client device interface 406 can facilitate communication with one or more movable objects and client devices. Movable object interface 404 can enable the server 126 to provide feature set data, including data about the requested feature and/or hardware drivers such as sensor drivers, from the server to a movable object. Similarly, client device interface 406 can enable the server 126 to provide feature set data, including action data and sensor data, from the server to a client device and/or receive instructions from a client device to provide the feature set data to one or more movable objects. As discussed, server 126 can include one or more applications, such as an object storage service, database, application (e.g., app) store, or other application or service. In some embodiments, a protocol router 408 can route data as it received through any of the interfaces included in communication manager 402. Routing may be performed based on the data or metadata received, protocol, contents, or other communication characteristics.

In some embodiments, communication manager 402 may include an authorization manager 410, movable object manager 412, and update manager 414. The authorization manager may be used to authorize access to various features before the features are provided to a client device or movable object. For example, license data or other account data may be received from a client device or movable object with a request for a feature. The license data may be authorized before the feature data is provided to the client device or movable object. In some embodiments, movable object manager 412 may associate an identifier with a movable object and maintain a profile for the movable object. For example, the profile may include historical data, such as a download history, authorization history, etc. In some embodiments, the profile may include application-specific profiles. For example, a movable object may have an inspection profile and a photography profile. The inspection profile may include a first feature set that enables the movable object to perform object inspection, and the photography profile may include a second feature set for more generalized photography. A user, through a client device, may select the profile for the movable object to use, and the server 126 may perform setup on the movable object and the client device to install the corresponding feature set. In some embodiments, an update manager 414 may track new versions of features as they become available, and may make the update for the installed features accessible to the movable object and/or client device. In some embodiments, the update manager 414 may perform updates automatically (e.g., using "push" technologies) and/or in response to an update request received from a user (e.g., using "pull" technologies).

As shown, server 126 can include one or more feature sets 416. Server 126 may maintain client-side and movable object-side features for sensors 418 and actions 422. As shown, each sensor may correspond to a sensor driver 424, which may include software 430 and/or hardware drivers 428, or other software/hardware that enables the features to be utilized. In some embodiments, the hardware sensor is installed to the movable object and the hardware driver 428 corresponds to the movable object-side feature, while the software driver 430 corresponds to the client-side feature which may enables the client device to request and receive data from the hardware sensor. Similarly, actions 422 may correspond to client-side action features 432 and movable object features 434. For example, client-side action features 432 may include code and/or interfaces for invoking a corresponding onboard action 343. The movable object features 434 may include code for performing the action by the movable object, and may include an interface for receiving inputs from the client-side feature and providing response data indicating the performance of the action. In various embodiments, a version manager 420 may manage client-side and movable object-side pairs, such that when a client device requests a feature be downloaded to the client device and a movable object, the same version of that feature is downloaded to both.

Figure 5:
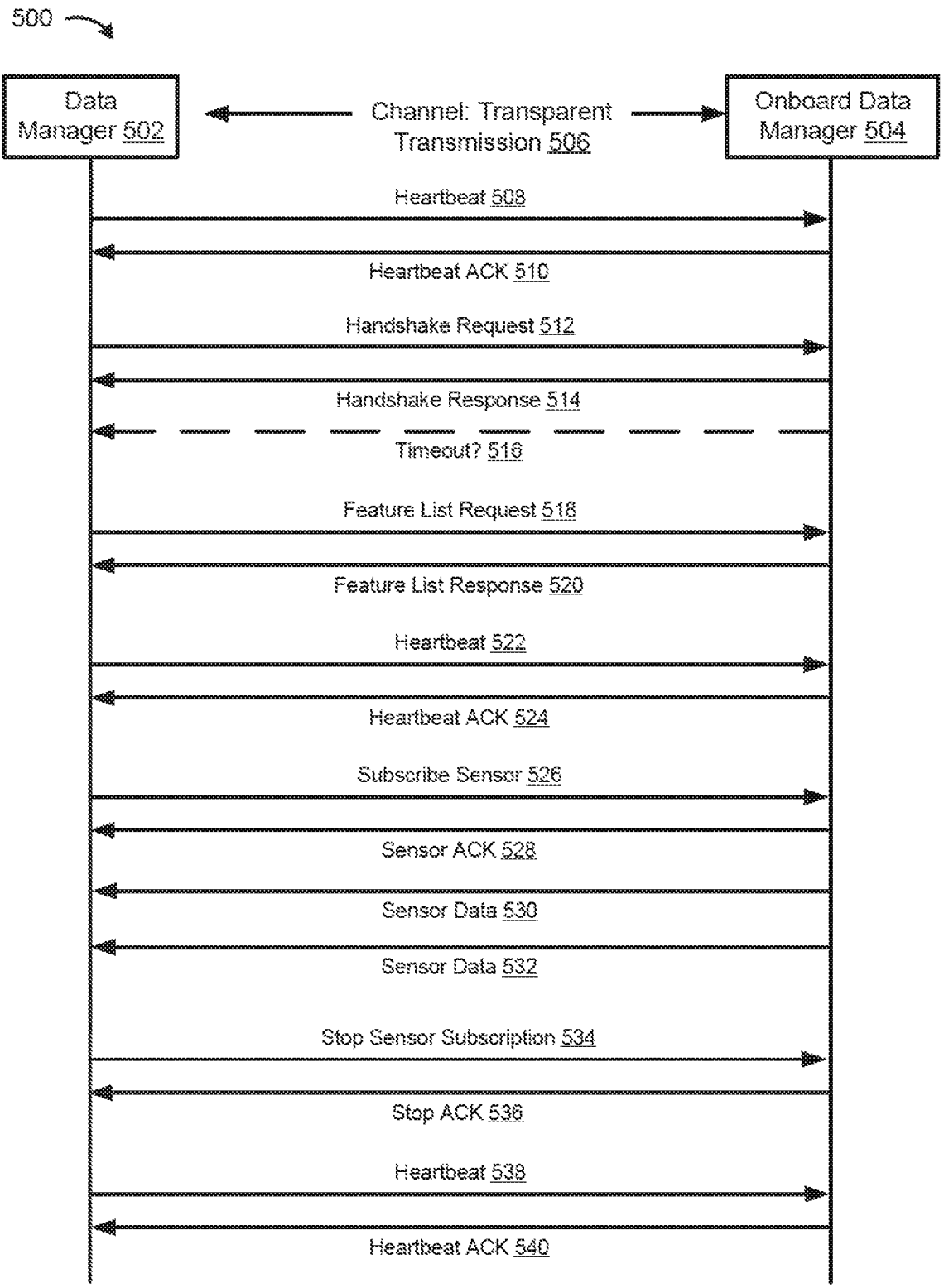
FIG. 5 illustrates a sequence diagram of communication between a data manager and an onboard data manager, in accordance with various embodiments of the present invention.

FIG. 5 illustrates a sequence diagram 500 of communication between a data manager and an onboard data manager, in accordance with various embodiments of the present invention. As shown in FIG. 5, a data manager 502 installed to a client device may communicate with an onboard data manager 504 installed to a movable object over a transparent transmission channel 506 of a physical communication link. In some embodiments, transparent transmission channel is provided through the flight controller onboard the movable object which allows the data to pass through unchanged (e.g., "transparent"). In some embodiments, the communication channel may directly connect the client data manger to the onboard data manager, e.g., through a WiFi link. Communication may begin with the data manager 502 sending heartbeats 508. Each heartbeat may be a message indicating the presence of data manager 502 and requesting a response from any available onboard data managers. In some embodiments, the frequency of heartbeats may vary. For example, at startup, heartbeats may be sent with a high frequency and that frequency may slow down over time. In some embodiments, after an onboard data manager has connected, heartbeats may be sent to prevent disconnection if commands have not been sent or received within a threshold amount of time. Onboard data manager 504 may respond with a heartbeat acknowledgment 510 indicating its presence. Thereafter, data manager 502 may initiate a handshake request 512. The handshake request may include a request for available features from the onboard data manager 504. In some embodiments, the handshake request may also include a request for version information associated with the available features and/or the onboard data manager. In some embodiments, version data may be requested in a separate request. If the onboard data manager is not available (e.g., if a movable object communicating on the transparent transmission channel does not include an onboard data manager) then the request may timeout 516. If the request times out, the data manager 502 may determine that the onboard data manager 504 is not available, and further communication regarding available features, sensors, etc. may terminate.

In some embodiments, if the onboard data manager 504 is available, a handshake response 514 may be sent including the requested version data. The data manager may request a feature list 518 and receive a feature list 520 in response from the onboard data manager. As discussed, the feature list may include various actions and/or sensors that are available through onboard data manager 504. The data manager and onboard data manager may continue to exchange heartbeats 522, 524 until further instructions are sent. For example, the data manager may subscribe to a sensor 526 available on the feature list from the onboard data manager. The onboard data manager may acknowledge 528 the subscription and may begin sending sensor data 530, 532 from the subscribed sensor. Following the acknowledgement 528, a sensor driver may cause the corresponding sensor to collect sensor data. The sensor driver may then provide the sensor data to the onboard data manager, which may provide the sensor data to the client-side data manager that subscribed to the sensor. In some embodiments, the sensor data may be sent at a predetermined frequency or may be sent as it is received. A specific frequency may be requested by the client-side data manager in the subscription request, or in a separate request. The client-side data manager may provide the received sensor data to the application executing on the client device which subscribed to the sensor. In some embodiments, the sensor driver may convert the sensor data received from the sensor into a form that is readable by the onboard data manager and/or client-side data manager. Once the data manager no longer needs the sensor data (e.g., once the application executing on the client device has completed its execution, once the movable object has completed an associated action, or other end condition), a request to stop the sensor subscription 534 may be sent. The stop subscription may be acknowledged 536 and the sensor data transmissions may terminate. Thereafter, heartbeats 538, 540 may continue to be exchanged to indicate that the connection is maintained.

Figure 6:
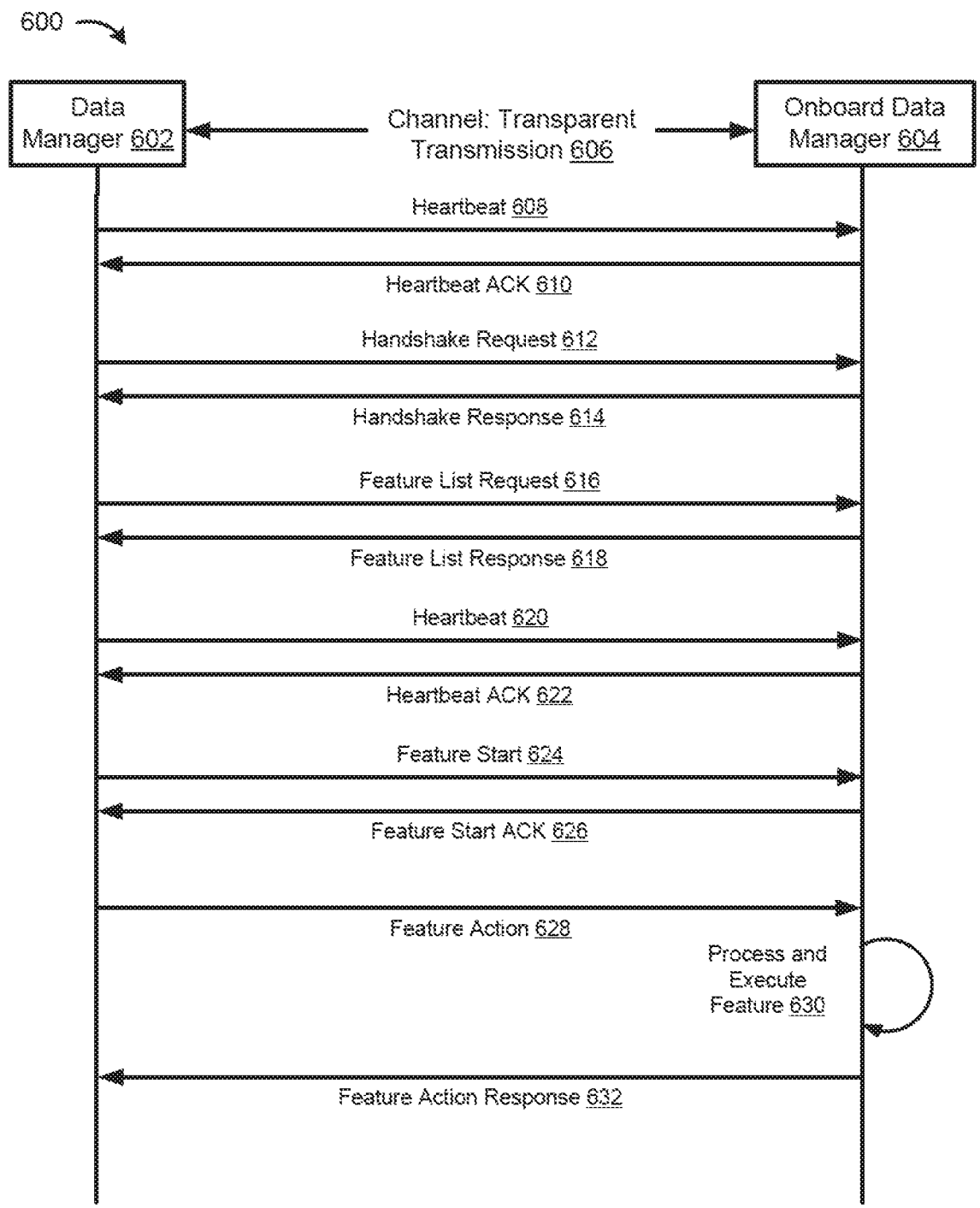
FIG. 6 illustrates another sequence diagram of communication between a data manager and an onboard data manager, in accordance with various embodiments of the present invention.

FIG. 6 illustrates another sequence diagram 600 of communication between a data manager and an onboard data manager, in accordance with various embodiments of the present invention. Like in FIG. 5, in FIG. 6, a data manager 602 installed to a client device may communicate with an onboard data manager 606 installed to a movable object over a transparent transmission channel 606 of a physical communication link. Communication may begin with the data manager 602 sending heartbeats 608. Onboard data manager 604 may respond with a heartbeat acknowledgment 610 indicating its presence. Thereafter, data manager 602 may initiate a handshake request 612. The handshake request may include a request for version data for the onboard data manager 604. The data manager may request a feature list 616 and receive a feature list 618 in response from the onboard data manager. As discussed, the feature list may include various actions and/or sensors that are available through onboard data manager 604. The data manager and onboard data manager may continue to exchange heartbeats 620, 622 until further instructions are sent. For example, the data manager may send a request to start a feature 624 available on the feature list from the onboard data manager. The onboard data manager may acknowledge 626 the request. The data manager 602 may send a feature action message 628 including data associated with the requested action. For example, the requested action may be a complex waypoint action, where the user may specify one or more waypoints, an acceleration profile between the waypoints, and/or one or more control points that define paths between the waypoints. The feature action 628 may include a set of waypoints and an acceleration profile. The onboard data manager 604 may use this data to process and execute 630 the requested feature and provide a feature action response 632. The response may include an indication that the action is being performed, such as real-time position data for the movable object.

Figure 7:
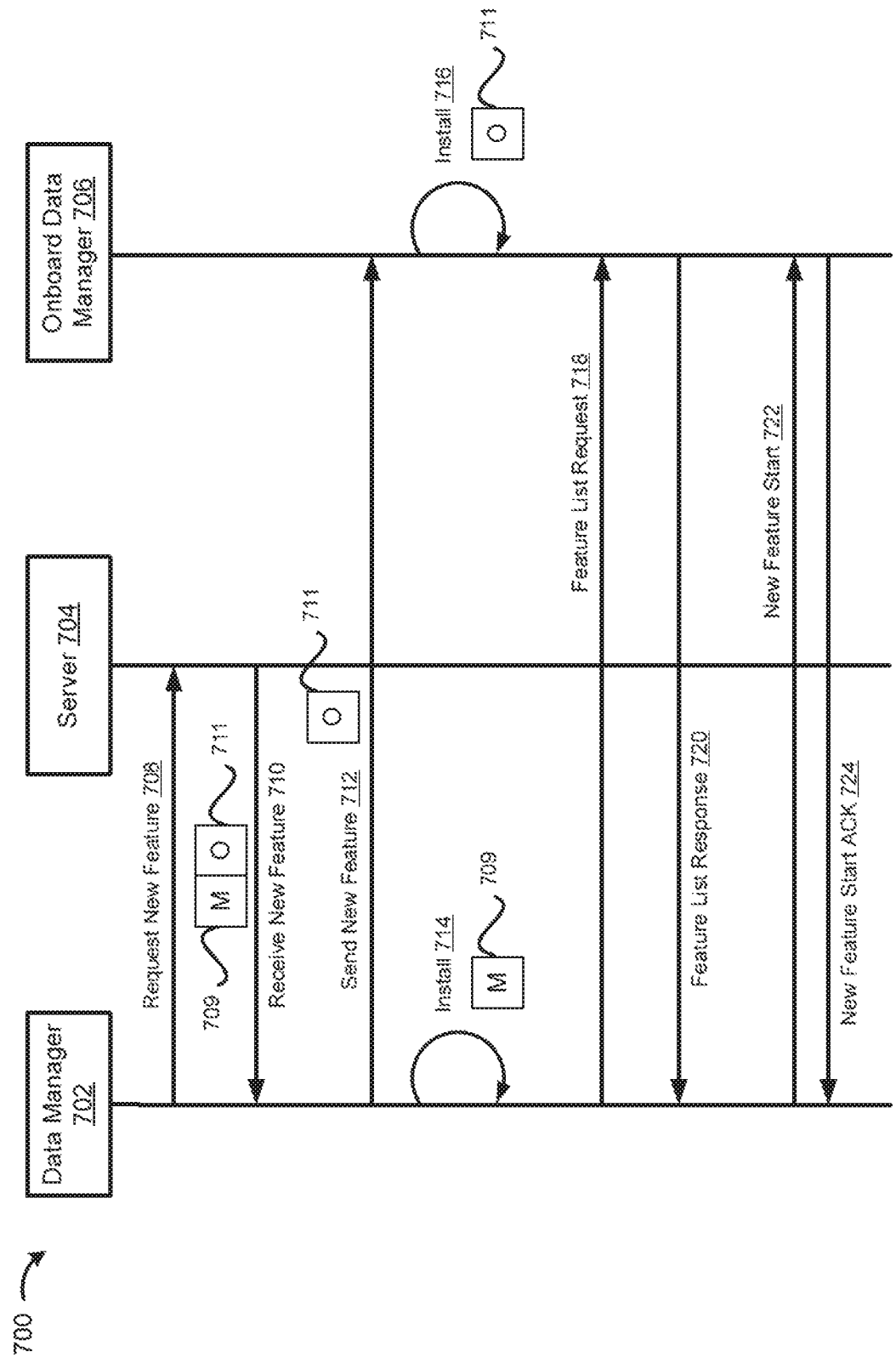
FIG. 7 illustrates a sequence diagram of communication between a data manager, server, and an onboard data manager, in accordance with various embodiments of the present invention.

FIG. 7 illustrates a sequence diagram 700 of communication between a data manager 702, server 704, and an onboard data manager 706, in accordance with various embodiments of the present invention. As shown in FIG. 7, a data manager 702 may request a new feature 708 from server 704. As discussed, server 704 may include one or more applications, such as an app store, through which features may be requested. In some embodiments, features may be loaded from various storage devices (e.g., from a USB drive, from a cloud storage provider, via wireless transmission). Server 704 may respond with the new feature 710, which may include a data manager installer 709 and an onboard data manager installer 711. The data manager 702 may provide the new feature 712 to the onboard data manager 706. This message may include the onboard data manager installer 711, or the installer may be provided in one or more separate messages. In some embodiments, onboard data manager 706 may be provided with a token or other identifier with which it may obtain the installer 711 directly from server 704. Both the data manager 702 and the onboard data manager may use their respective installers 709, 711 to install 714, 716 the new feature. Data manager 702 may then request a feature list 718 from the onboard data manager 706 and receive a feature list in response 720. If the new feature has been correctly installed, the new feature will appear in the feature list response. The data manager may then request to start the new feature 722 and a new feature start acknowledgement may be received. Processing may then continue as discussed above with respect to FIG. 6.

Figure 8:
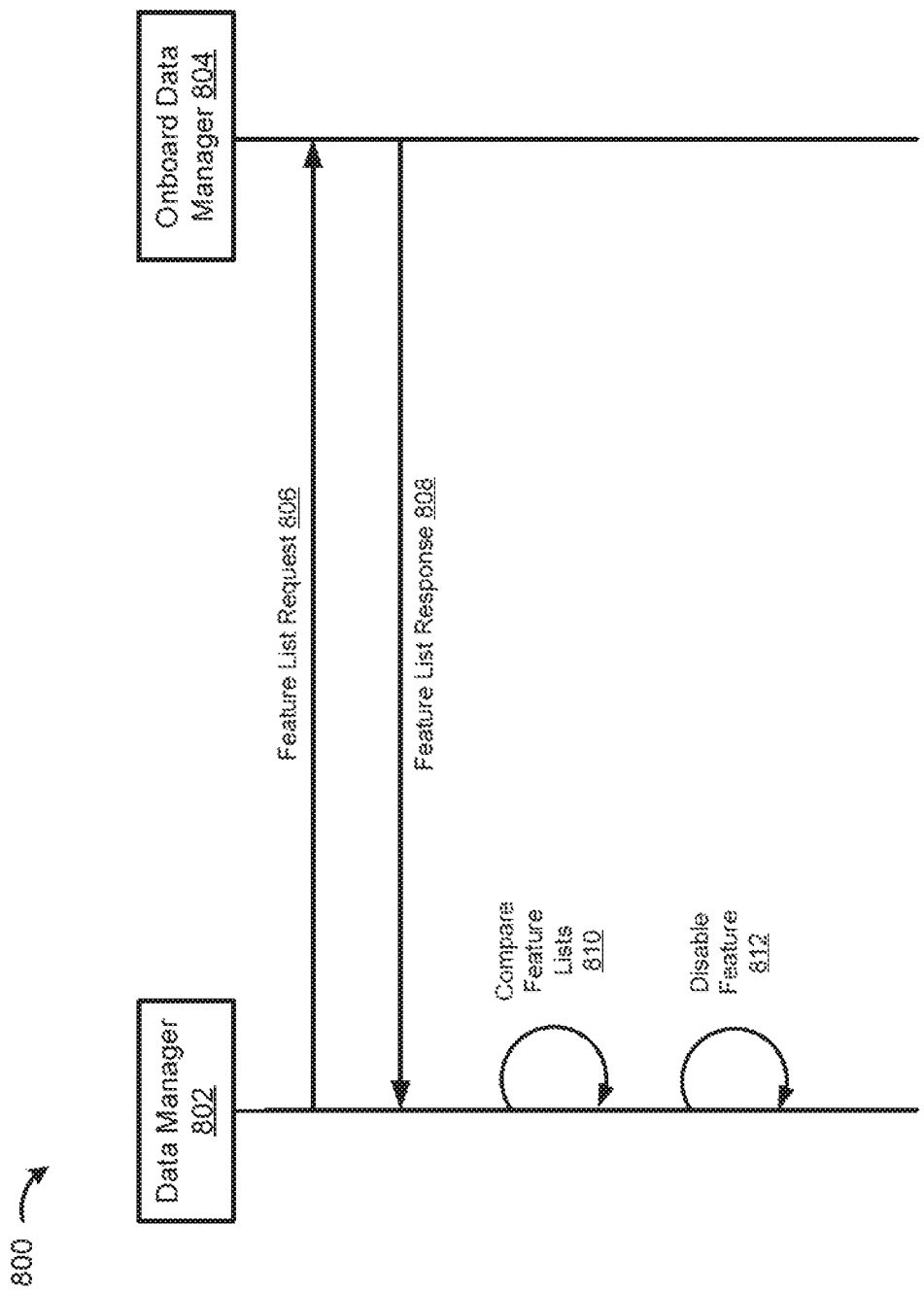
FIG. 8 illustrates another sequence diagram of communication between a data manager and an onboard data manager, in accordance with various embodiments of the present invention.

FIG. 8 illustrates another sequence diagram 800 of communication between a data manager 802 and an onboard data manager 804, in accordance with various embodiments of the present invention. As shown in FIG. 8, a data manager 802 may request a feature list 806 from onboard data manager 804. A feature list is then provided in response 808 from the onboard data manager. For example, data manager 802 may have just connected to a new movable object and is requesting the feature list to determine what features the new movable object possesses. The data manager 802 may then compare 810 the feature list received from onboard data manager 804 to the data manager's own feature list. Features that are available through the data manager 802, but not available through the onboard data manager, may be disabled 812. In some embodiments, the missing features may be made available through the onboard data manager by communicating with a server, such as described above with respect to FIG. 7.

Figure 9:
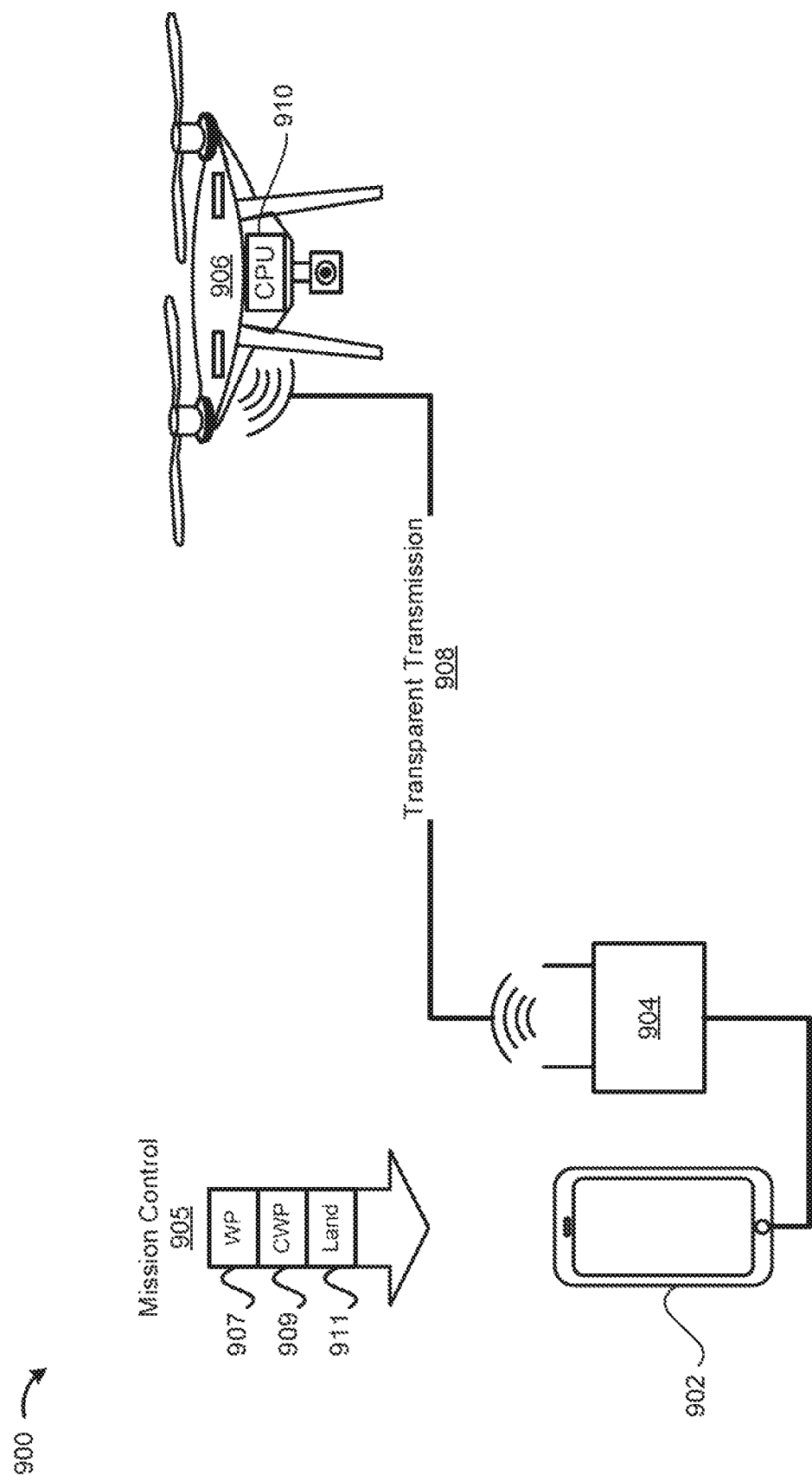
FIG. 9 illustrates an example of performing a sequence of actions in a movable object environment, in accordance with various embodiments of the present invention.

FIG. 9 illustrates an example of performing a sequence of actions in a movable object environment 900, in accordance with various embodiments of the present invention. As shown in FIG. 9, a client device 902, such as a smartphone, personal computer, or other mobile device, may be connected to a remote control 904. As discussed, user intent may be received as input to client device 902 and/or remote control 904. User intent may identify one or more actions the user intends the movable object to perform, such as hover, travel in an intended direction, etc. This intent may be converted into commands by a data manager executing on client device 902 or by an onboard data manager executing on movable object 906. Those commands may then be executed by a flight controller on movable object 906 to be executed. In some embodiments, commands may be sent to the flight controller over a wireless communication channel 908. As discussed, the commands may be packed and unpacked by routers in the client device 902 and movable object 906.

In some embodiments, a series of actions may be queued in mission control 905. For each action, the data manager may dynamically determine how the action is to be processed. For example, a waypoint mission 907, in which the movable object is instructed to travel between at least two waypoints, may be processed by the data manager executing on client device 902 to generate one or more commands. These commands may then be sent via the transparent transmission channel 908 to a flight controller on movable object 906. When a response is received indicating that the waypoint mission is complete, the next mission in the queue, complex waypoint mission 909, may be processed. The data manager can determine that the onboard data manager executing on CPU 910 is to process this mission. This processing eliminates latency between the processing data manager and the flight controller, as commands can be provided over a wired connection. As discussed above with respect to FIG. 6, this may include sending a start feature command to the onboard data manager 910 and providing control data which defines a curved path to follow between waypoints. Other actions may also be performed by the onboard data manager, such as course correction to precisely maintain a heading, object detection, or other actions.

In some embodiments, if the onboard data manager is not available, e.g., if it times out as described above, or if the requested action is not available through the onboard data manager, processing of complex waypoint mission 909 may be dynamically reassigned to the client device's data manager. For example, the complex waypoint mission may be processed as a series of smaller simple waypoint missions resulting in commands that can be passed to the flight controller for execution. The mission queue may end with a landing instruction 911, which may be processed by either the client device's data manager or the onboard data manager. One advantage of this system is that it provides redundancy by enabling the client device's data manager to support various actions when the onboard data manager is unavailable; and vice versa.

Figure 10:
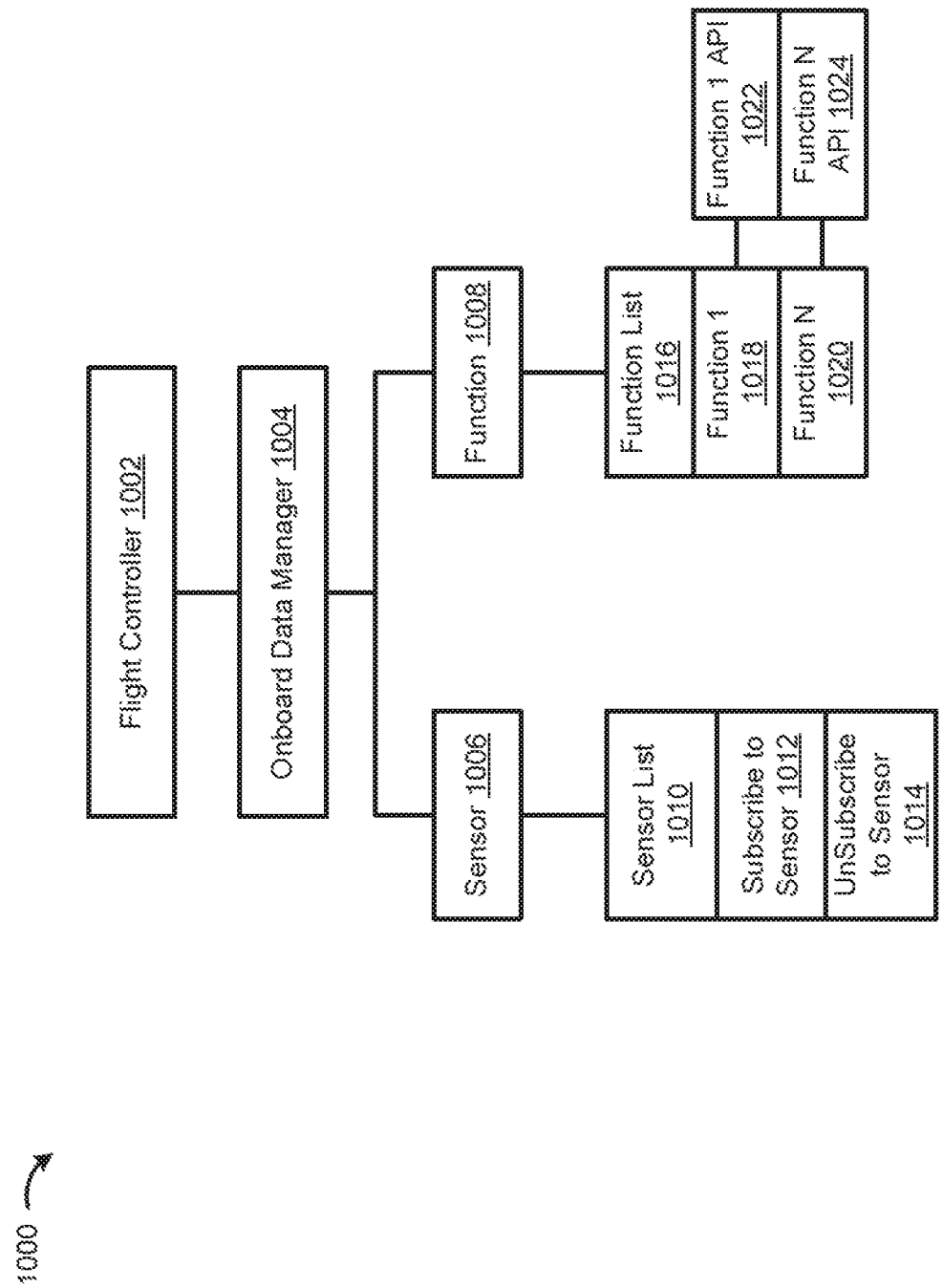
FIG. 10 illustrates an example of available onboard actions in a movable object environment, in accordance with various embodiments of the present invention.

FIG. 10 illustrates an example of available onboard commands 1000 in a movable object environment, in accordance with various embodiments of the present invention. As shown in FIG. 10, a client device manager can access an onboard data manager class 1004 through a flight controller class 1002. The onboard data manager class 1004 exposes sensor and-functions through corresponding classes 1006 and 1008. Functions as described herein may include actions as discussed above. For example, the sensor class 1006 may include sensor commands as discussed above with respect to FIG. 5, such as a get sensor list command 1010, a subscribe command 1012, and an unsubscribe command. Similarly, the function class 1008 may expose function commands, such as those discussed above with respect to FIG. 6, including a get function list command 1016, and various start function commands 1018, 1020. In some embodiments, each start function command may further expose its own application programming interface, through which data to perform the corresponding function may be provided to the onboard data manager (e.g., control data, waypoints, etc.). In some embodiments, the various commands may be invoked by the client device data manager and/or through an operator object created by the client device data manager which may invoke the requested action.

Figure 11:
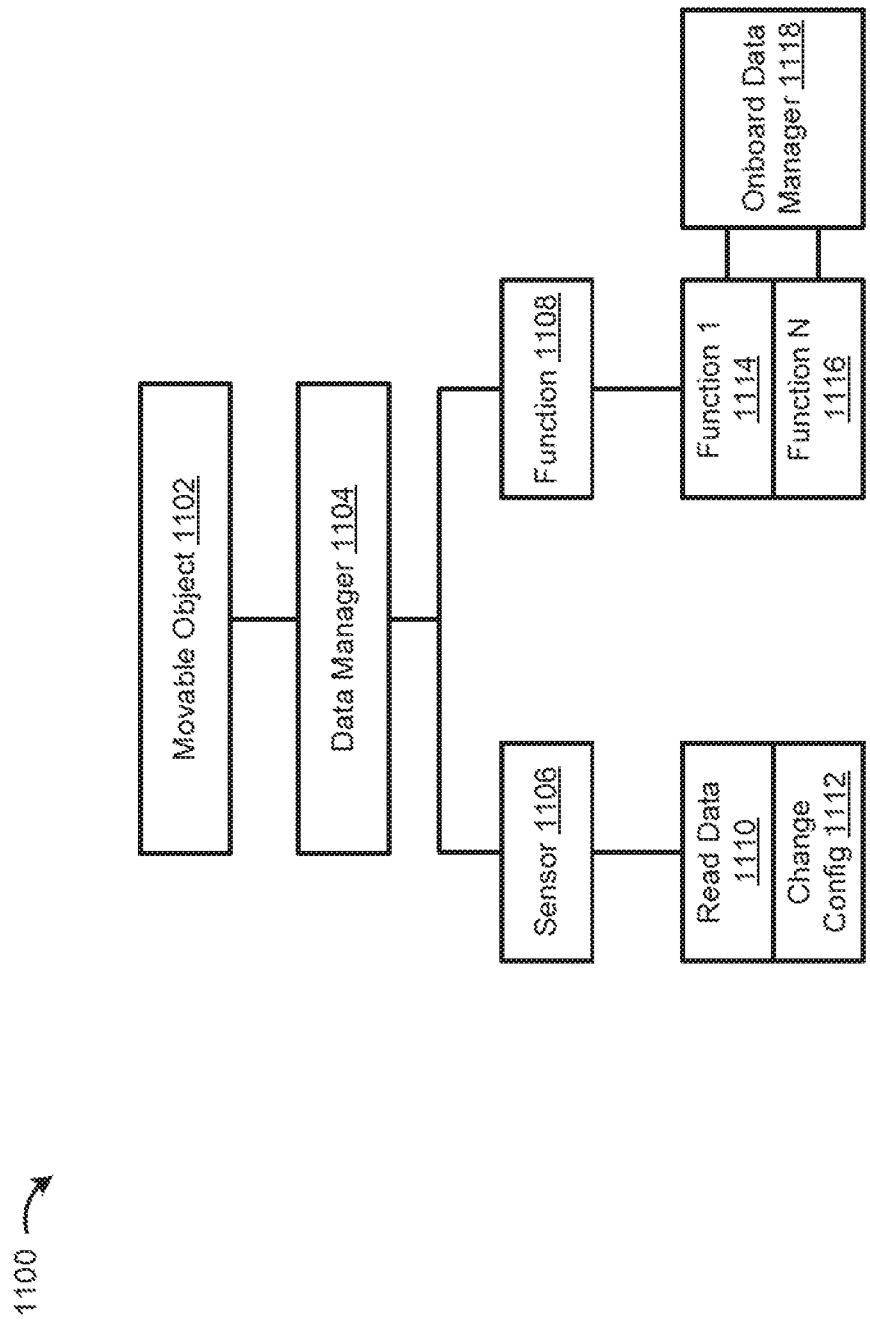
FIG. 11 illustrates an example of available client actions in a movable object environment, in accordance with various embodiments of the present invention.

FIG. 11 illustrates an example of available client actions 1100 in a movable object environment, in accordance with various embodiments of the present invention. The client device data manager may be accessed through a data manager class 1104 exposed by a movable object class 1102. Data may be received from the client device data manager with instructions. These instructions may invoke functions exposed by a sensor class 1106 or function class 1108. Functions as described herein may include actions as discussed above. For example, instructions to read or subscribe to sensor data or to calibrate or configure sensors, may be passed through corresponding interfaces 1110 and 1112. As discussed above, individual functions may expose their own APIs to receive data to perform the corresponding actions. These APIs may provide access to function interfaces 1114, 1116 which may pass the corresponding action and data to the onboard data manager 1118 for processing. As discussed, the onboard data manager 1118 may process these commands into a series of flight commands to be executed by the flight controller. Status messages may be returned through the corresponding interfaces to the client device data manager.

Although embodiments have generally been discussed with respect to missions, these represent an example feature that may be used with various embodiments. Additional features may include course correction, image/object detection, machine learning path finding, real-time condition adaption, or other actions. For example, machine learning can be used to learn target object models and be able to know where the movable object is in space relative to a target object, based on collected image data. Machine learning may also be used to determine how a movable object behaves under different real-world conditions, such as in different wind or weather conditions and may adjust mission parameters accordingly. For example, a safety buffer distance may be increased or decreased based on how a movable object has been determined to perform in those conditions based on past performance data. In some embodiments, low energy pathfinding actions may be performed to determine a flight path in real-time which minimizes the energy required to traverse. For example, if a movable object's battery is low, a path may be determined that minimizes energy use to extend flight time, and this new path may be adopted dynamically.

Figure 12:
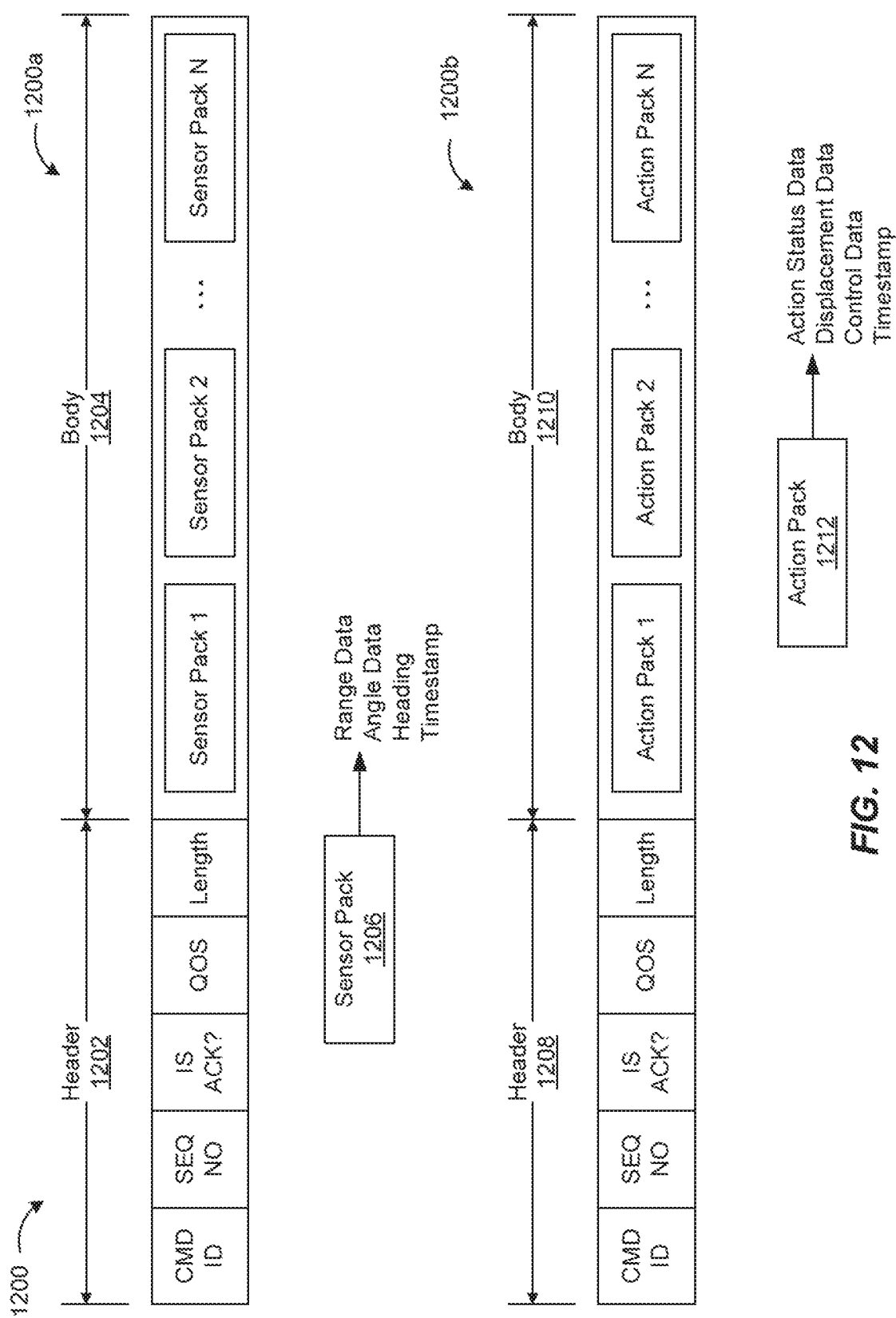
FIG. 12 illustrates example packets of a custom communication protocol in a movable object environment, in accordance with various embodiments of the present invention.

FIG. 12 illustrates example packets of a custom communication protocol 1200 in a movable object environment, in accordance with various embodiments of the present invention. As shown in FIG. 12, a sensor packet 1200*a* may include a header portion 1202 and a body portion 1204. The header portion may include a command identifier, sequence number, or other data. In some embodiments, sensor data may be packed and provided in body 1204. Each sensor pack 1206 may include data gathered by one or more sensors, such as range data, angle data, heading, timestamp, etc., and may correspond to a sensor data for one sensor (e.g., sensor pack 1 may correspond to sensor data from an image senor, sensor pack 2 may correspond to sensor data from a magnetometer, etc.). Sensor pack 1206 illustrates the structure of one of the sensor packs 1-N, however depending on the sensor in use, the data included in the sensor pack or structure of the sensor pack may vary. In some embodiments, the mobile device can invoke more than one sensor in a single request and one response can include response data for some or all of the invoked sensors. In some embodiments, each sensor request may receive a corresponding sensor response that includes sensor data for the corresponding request.

Similarly, the protocol may be used to provide data related to the execution of an action. In such an embodiment, an action response packet 1200b may include a header 1208 may include the same or substantially similar information as when sensor data is being transmitted, however the body 1210 may instead include packed action data. Each action pack 1212 may include data related to the action being performed, such as status data, displacement data, control data, timestamp data, etc. In some embodiments, the action packs 1-N may include action data for a single action being performed, or may include data for multiple actions. Action pack 1212 illustrates the structure of one of the action packs 1-N, however depending on the action being performed, the action pack 1212 data or the structure of the action pack may vary. In various embodiments, the action response packet 1200b shown in FIG. 12 may be used to invoke one or more specific commands (e.g., using the command ID field) and/or upload data (e.g., to upload feature data to an onboard data manager, to upload sensor data to a client device data manager, etc.). In some embodiments, the mobile device can invoke more than one action in a single request and one response can include response data for some or all of the action responses. In some embodiments, each request may receive a corresponding response that includes response data for the corresponding request.

Figure 13:
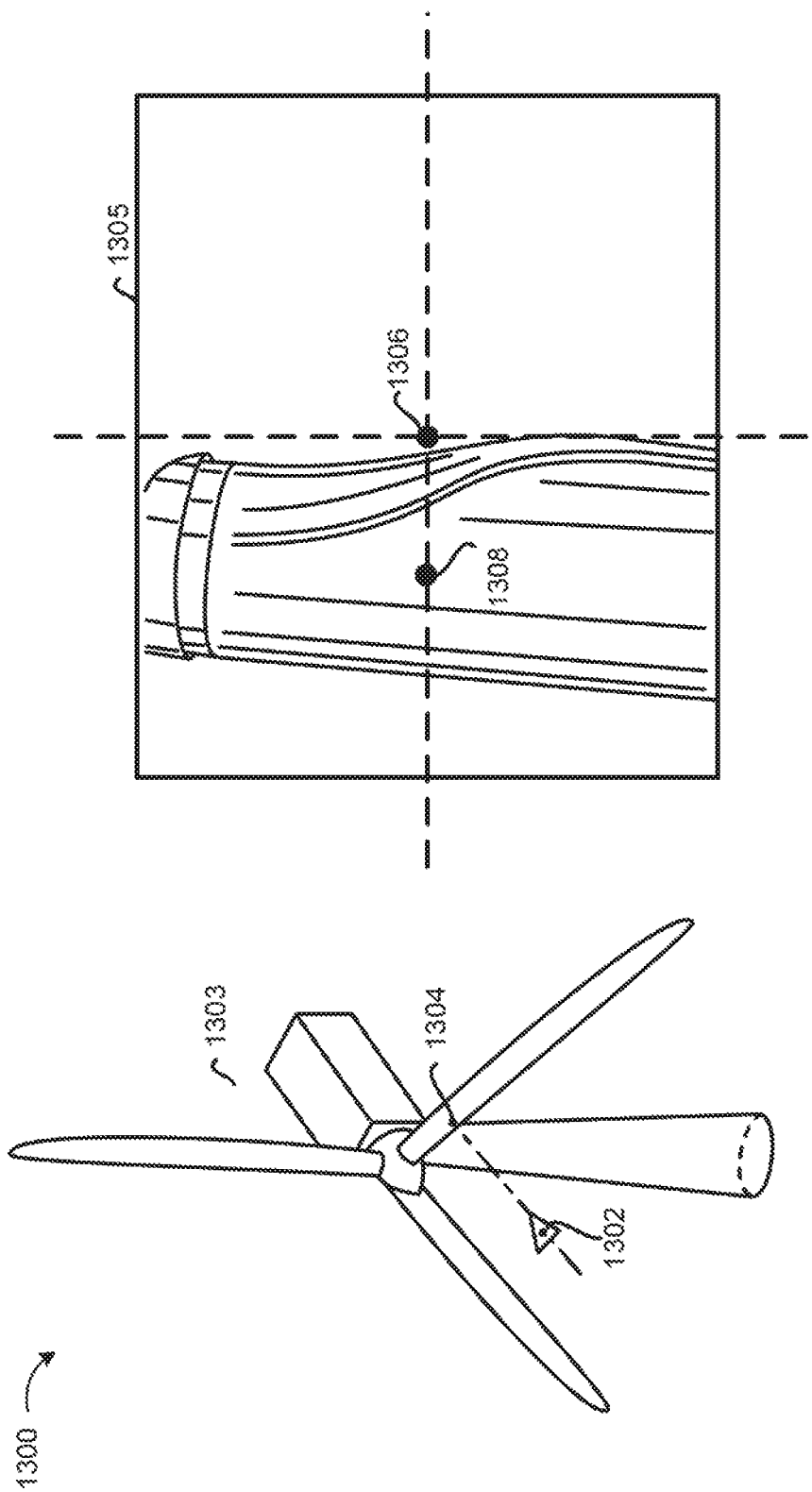
FIG. 13 illustrates an example of an action, in accordance with various embodiments of the present invention.

FIG. 13 illustrates an example of an action in a movable object environment 1300, in accordance with various embodiments of the present invention. As shown in FIG. 13, an action may include an object centering action during an inspection mission. A movable object 1302 can perform inspection missions of various target objects 1303. Such an inspection mission may include capturing image or video data of the target object, or portions 1304 of the target object. For example, image data 1305 shows the portion 1304 of the target object. However, the image is off-center, which may limit the usefulness of the image data to complete the inspection mission. As such, object centering action may be executed by an onboard data manager on the movable object 1302 to analyze the image data, determine an offset based on the image data, and capture new image data. For example, the onboard data manager may determine a difference in pixels between a center point 1306 of the image data and a center point 1308 of the representation of the target object in the image data. In some embodiments, center point 1308 may be determined using image processing, machine learning, or other techniques. The onboard data manager may convert the different between points 1306 and 1308 in pixels into a real-world displacement, based on the known position of the movable object when the image data was captured (e.g., the coordinates of the movable object and a distance from the target object) and the characteristics of the image capture device in use. The resulting displacement may then be used to determine a new position from which to capture image data in which the target object is centered. In some embodiments, the displacement may be applied to future positions in the inspection mission.

Figure 14:
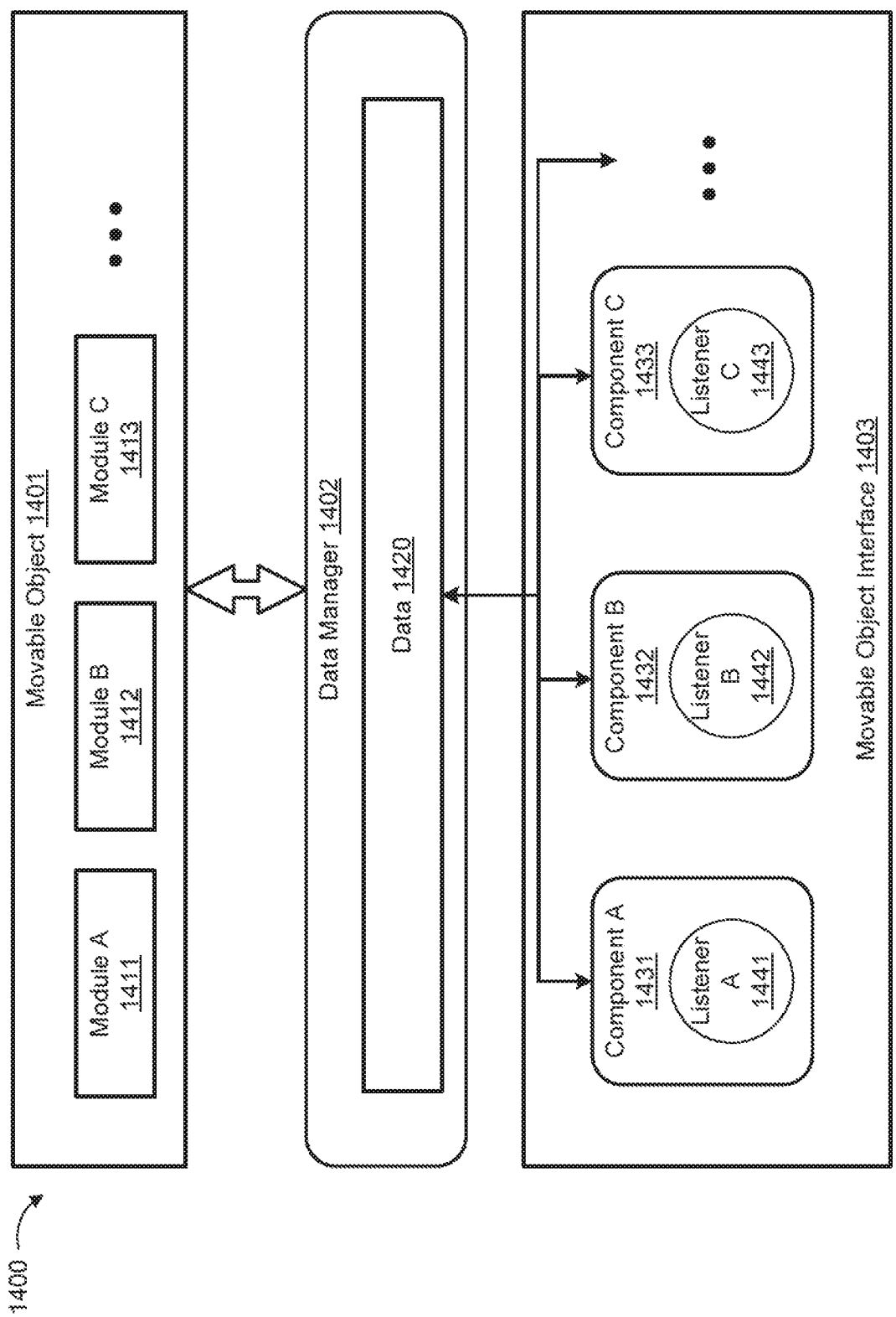
FIG. 14 illustrates an example of supporting a movable object interface in a software development environment, in accordance with various embodiments of the present invention.

FIG. 14 illustrates an example of supporting a movable object interface in a software development environment, in accordance with various embodiments of the present invention. As shown in FIG. 14, a movable object interface 1403 can be used for providing access to a movable object 1401 in a software development environment 1400, such as a software development kit (SDK) environment. As discussed above, the data manager can be provided as part of an SDK or mobile SDK to enable applications to perform custom actions, access new sensors and sensor data, etc. Likewise, the onboard data manager can be provided as part of an SDK or onboard SDK to enable all or portions of these custom actions to be performed directly on the movable object, reducing latency and improving performance.

Furthermore, the movable object 1401 can include various functional modules A-C 1411-1413, and the movable object interface 1403 can include different interfacing components A-C 1431-1433. Each said interfacing component A-C 1431-1433 in the movable object interface 1403 can represent a module A-C 1411-1413 in the movable object 1401.

In accordance with various embodiments of the present invention, the movable object interface 1403 can provide one or more callback functions for supporting a distributed computing model between the application and movable object 1401.

The callback functions can be used by an application for confirming whether the movable object 1401 has received the commands. Also, the callback functions can be used by an application for receiving the execution results. Thus, the application and the movable object 1401 can interact even though they are separated in space and in logic.

As shown in FIG. 14, the interfacing components A-C 1431-1433 can be associated with the listeners A-C 1441-1443. A listener A-C 1441-1443 can inform an interfacing component A-C 1431-1433 to use a corresponding callback function to receive information from the related module(s).

Additionally, a data manager 1402, which prepares data 1420 for the movable object interface 1403, can decouple and package the related functionalities of the movable object 1401. Also, the data manager 1402 can be used for managing the data exchange between the applications and the movable object 1401. Thus, the application developer does not need to be involved in the complex data exchanging process.

For example, the SDK can provide a series of callback functions for communicating instance messages and for receiving the execution results from an unmanned aircraft. The SDK can configure the life cycle for the callback functions in order to make sure that the information interchange is stable and completed. For example, the SDK can establish connection between an unmanned aircraft and an application on a smart phone (e.g. using an Android system or an iOS system). Following the life cycle of a smart phone system, the callback functions, such as the ones receiving information from the unmanned aircraft, can take advantage of the patterns in the smart phone system and update the statements accordingly to the different stages in the life cycle of the smart phone system.

Figure 15:
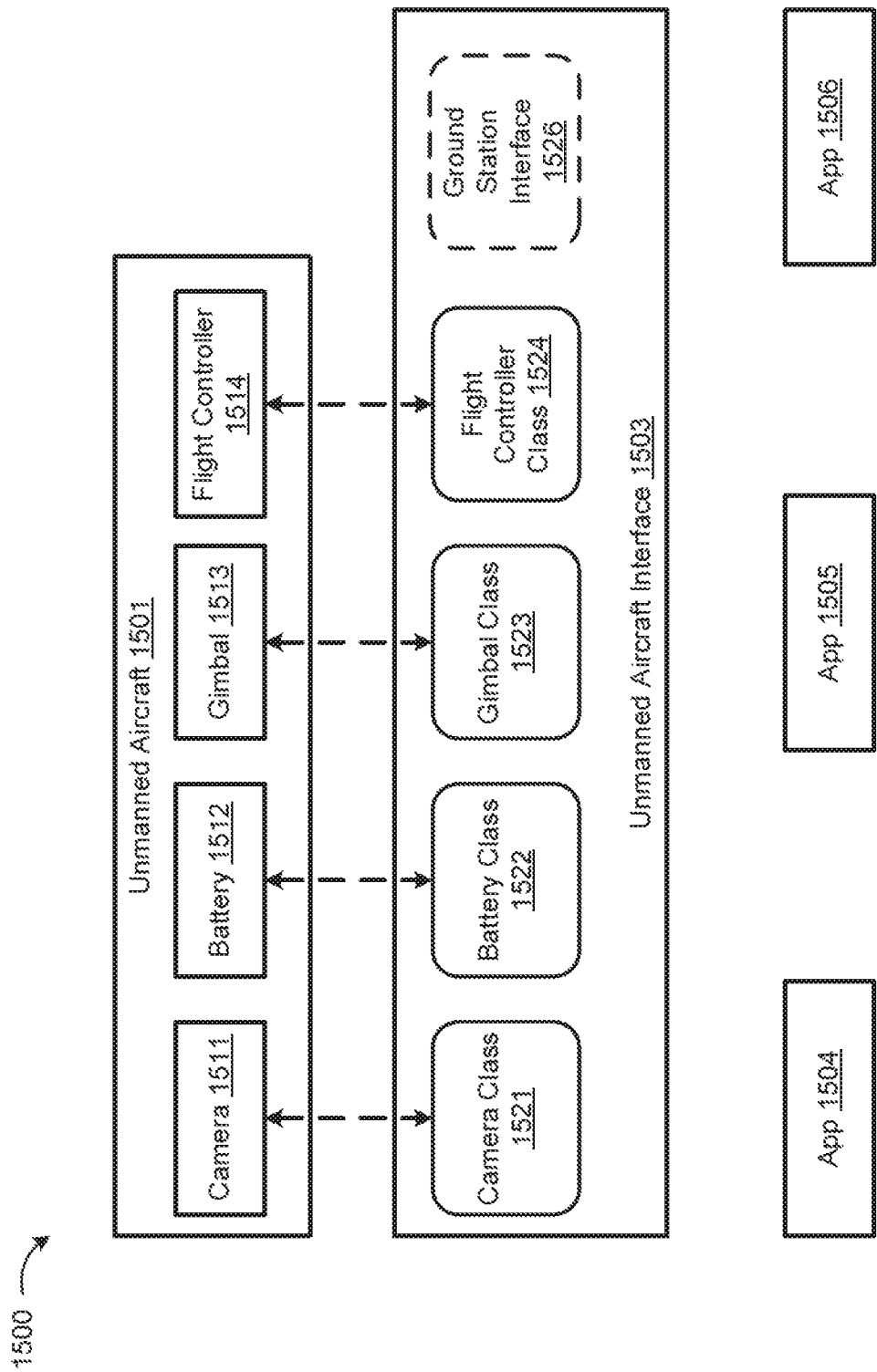
FIG. 15 illustrates an example of an unmanned aircraft interface, in accordance with various embodiments of the present invention.

FIG. 15 illustrates an example of an unmanned aircraft interface, in accordance with various embodiments. As shown in FIG. 15, an unmanned aircraft interface 1503 can represent an unmanned aircraft 1501. Thus, the applications, e.g. APPs 1504-1507, in the unmanned aircraft environment 1500 can access and control the unmanned aircraft 1501. As discussed, these apps may include an inspection app 1504, a viewing app 1505, and a calibration app 1506.

For example, the unmanned aircraft 1501 can include various modules, such as a camera 1515, a battery 1512, a gimbal 1513, and a flight controller 1514.

Correspondently, the movable object interface 1503 can include a camera component 1521, a battery component 1522, a gimbal component 1523, and a flight controller component 1524.

Additionally, the movable object interface 1503 can include a ground station component 1526, which is associated with the flight controller component 1524. The ground station component operates to perform one or more flight control operations, which may require a high-level privilege.

Figure 16:
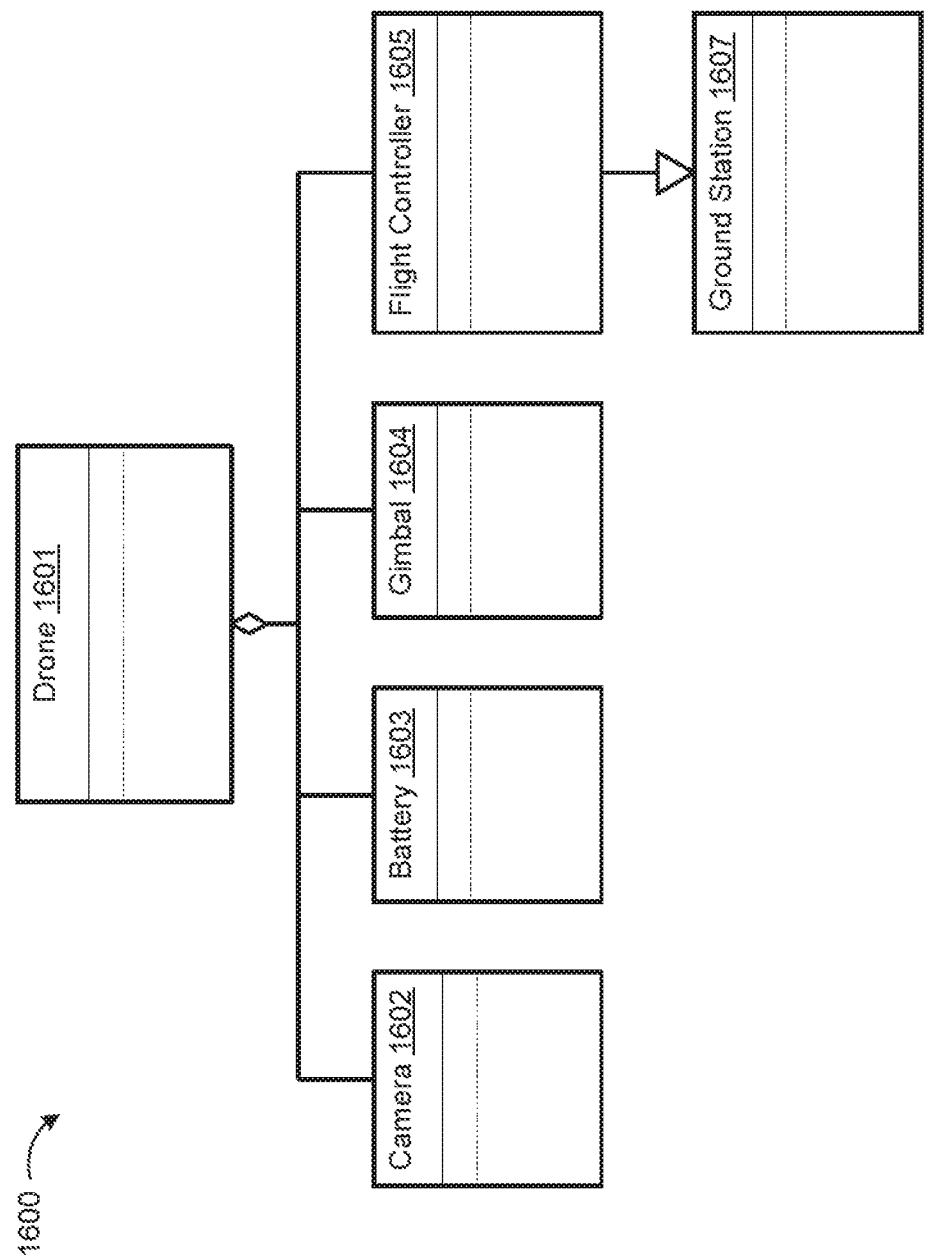
FIG. 16 illustrates an example of components for an unmanned aircraft in a software development kit (SDK), in accordance with various embodiments of the present invention.

FIG. 16 illustrates an example of components for an unmanned aircraft in a software development kit (SDK), in accordance with various embodiments. As shown in FIG. 16, the drone class 1601 in the SDK 1600 is an aggregation of other components 1602-1607 for an unmanned aircraft (or a drone). The drone class 1601, which have access to the other components 1602-1607, can exchange information with the other components 1602-1607 and controls the other components 1602-1607.

In accordance with various embodiments, an application may be accessible to only one instance of the drone class 1601. Alternatively, multiple instances of the drone class 1601 can present in an application.

In the SDK, an application can connect to the instance of the drone class 1601 in order to upload the controlling commands to the unmanned aircraft. For example, the SDK may include a function for establishing the connection to the unmanned aircraft. Also, the SDK can disconnect the connection to the unmanned aircraft using an end connection function. After connecting to the unmanned aircraft, the developer can have access to the other classes (e.g. the camera class 1602 and the gimbal class 1604). Then, the drone class 1601 can be used for invoking the specific functions, e.g. providing access data which can be used by the flight controller to control the behavior, and/or limit the movement, of the unmanned aircraft.

In accordance with various embodiments, an application can use a battery class 1603 for controlling the power source of an unmanned aircraft. Also, the application can use the battery class 1603 for planning and testing the schedule for various flight tasks.

As battery is one of the most restricted elements in an unmanned aircraft, the application may seriously consider the status of battery not only for the safety of the unmanned aircraft but also for making sure that the unmanned aircraft can finish the designated tasks. For example, the battery class 1603 can be configured such that if the battery level is low, the unmanned aircraft can terminate the tasks and go home outright.

Using the SDK, the application can obtain the current status and information of the battery by invoking a function to request information from in the Drone Battery Class. In some embodiments, the SDK can include a function for controlling the frequency of such feedback.

In accordance with various embodiments, an application can use a camera class 1602 for defining various operations on the camera in a movable object, such as an unmanned aircraft. For example, in SDK, the Camera Class includes functions for receiving media data in SD card, getting & setting photo parameters, taking photo and recording videos.

An application can use the camera class 1602 for modifying the setting of photos and records. For example, the SDK may include a function that enables the developer to adjust the size of photos taken. Also, an application can use a media class for maintaining the photos and records.

In accordance with various embodiments, an application can use a gimbal class 1604 for controlling the view of the unmanned aircraft. For example, the Gimbal Class can be used for configuring an actual view, e.g. setting a first personal view of the unmanned aircraft. Also, the Gimbal Class can be used for automatically stabilizing the gimbal, in order to be focused on one direction. Also, the application can use the Gimbal Class to change the angle of view for detecting different objects.

In accordance with various embodiments, an application can use a flight controller class 1605 for providing various flight control information and status about the unmanned aircraft. As discussed, the flight controller class can include functions for receiving and/or requesting access data to be used to control the movement of the unmanned aircraft across various regions in an unmanned aircraft environment.

Using the Main Controller Class, an application can monitor the flight status, e.g. using instant messages. For example, the callback function in the Main Controller Class can send back the instant message every one thousand milliseconds (1000 ms).

Furthermore, the Main Controller Class allows a user of the application to investigate the instance message received from the unmanned aircraft. For example, the pilots can analyze the data for each flight in order to further improve their flying skills.

In accordance with various embodiments, an application can use a ground station class 1607 to perform a series of operations for controlling the unmanned aircraft.

For example, the SDK may require applications to have a SDK-LEVEL-2 key for using the Ground Station Class. The Ground Station Class can provide one-key-fly, on-key-go-home, manually controlling the drone by app (i.e. joystick mode), setting up a cruise and/or waypoints, and various other task scheduling functionalities.

In accordance with various embodiments, an application can use a communication component for establishing the network connection between the application and the unmanned aircraft.

Figure 17:
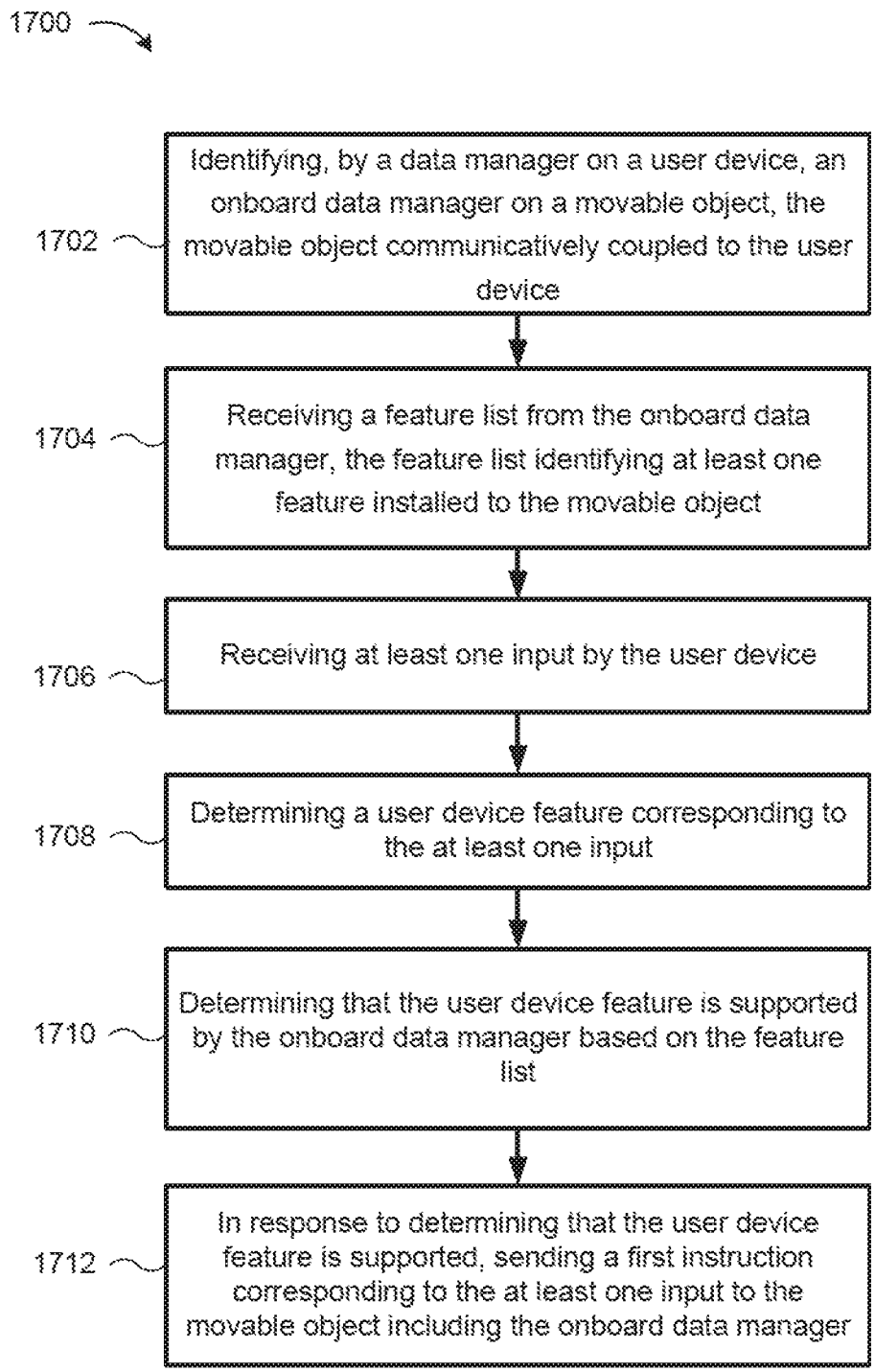
FIG. 17 shows a flowchart of communication management in a movable object environment, in accordance with various embodiments of the present invention.

FIG. 17 shows a flowchart 1700 of communication management in a movable object environment, in accordance with various embodiments. At step 1702 a data manager on a user device can identify an onboard data manager on a movable object, the movable object communicatively coupled to the client device. For example, as discussed above, at startup the data manager may begin sending heartbeat packets/messages. Each heartbeat may be a message indicating the presence of the data manager and requesting a response from any available onboard data managers that receive the heartbeats. When a heartbeat response is received from an onboard data manager, the onboard data manager has been identified and a handshake can be performed to complete the connection. In some embodiments, version data for the onboard data manager may be received with the handshake.

At step 1704, a feature list can be received from the onboard data manager. The feature list including at least one feature installed to the movable object. The feature list may be received in response to a request for the feature list from the data manager. In some embodiments, the feature list may include identifiers corresponding to the features installed on the movable object. In some embodiments, version information for each feature may be included in the feature list.

At step 1706, receiving at least one input by the user device. In some embodiments, the input may be a command from a user to perform a mission, including one or more mission instructions. In some embodiments, the at least one input can be to add a second sensor to the movable object, including a corresponding second sensor interface which includes a data subscription service and a calibration service.

At step 1708, determining a user device feature corresponding to the at least one input. For example, an input identifying one or more waypoints may correspond to a waypoint or complex waypoint feature. Similarly, an input corresponding to supporting a new sensor may correspond to a sensor subscription feature. At step 1710, the user device feature can be determined to be supported by the onboard data manager based on the feature list. This enables the data manager to determine whether the feature is also supported by the movable object. The comparison may include comparing feature identifiers and/or feature version data.

At step 1712, in response to determining that the user device feature is supported, a first instruction corresponding to the at least one input can be sent to the movable object including the onboard data manager. For example, the first instruction can be to subscribe to data from at least one sensor on the movable object or the first instruction can be a mission instruction, including one of an acceleration profile instruction or a complex waypoint instruction.

In some embodiments, the method may further include determining to process a second instruction by the data manager and processing the second instructions to generate a plurality of flight control instructions. The plurality of flight controller instructions can be sent to a flight controller at the movable object. In some embodiments, a second feature corresponding to the at least one input can be identified. A second corresponding feature can then be identified on the feature list. Version data associated with the corresponding feature and the user device feature can be compared. If it is determined that version data does not match, an updated second feature from a server can be requested and uploaded to the onboard data manager.

In some embodiments, the plurality of movable object features can include an onboard sensor interface configured to interface with at least one sensor and the user device feature includes a corresponding user device sensor driver configured to interface with the onboard sensor driver. In some embodiments, the instruction is to subscribe to data from the at least one sensor.

In some embodiments, at least one of the plurality of movable object features and a corresponding user device feature, collectively, implement a function related to at least one of computer vision, machine learning, or mission execution.

In some embodiments, the at least one input is to add a new feature to the at least one movable object. The at least one input to add the new feature to the at least one movable object can comprise uploading a movable object feature corresponding to the new feature to the movable object.

In some embodiments, the at least one input is to add a second sensor to the at least one movable object and wherein the movable object feature corresponding to the second sensor comprises a second sensor interface. The second sensor interface can include a data subscription service and a calibration service.

In some embodiments, the method may further include receiving at least one of a custom transform or a custom update associated with the at least one user interface element, and causing the at least one user interface element to be rendered using the at least one of a custom transform or a custom update.

In some embodiments, the movable object is an unmanned aerial vehicle. In some embodiments, the user interface can be displayed on a user device, and the user device may include one of a portable computing device, wearable computing device, virtual reality system, or augmented reality system.

Many features of the present invention can be performed in, using, or with the assistance of hardware, software, firmware, or combinations thereof. Consequently, features of the present invention may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

What is claimed is:

1. A system for communicating instructions in a movable object environment, comprising:
   at least one movable object including
     a first processor,
     a flight controller,
     at least one sensor, and
     an onboard data manager configured to implement a plurality of movable object features;
   a user device including
     a second processor, and
     a device data manager configured to implement a plurality of user device features,
       each user device feature corresponding to one of the plurality of movable object features, the device data manager including instructions that upon execution by the second processor cause the device data manager to:
       identify the onboard data manager on the movable object, the movable object communicatively coupled to the user device;
       receive a feature list from the onboard data manager, the feature list identifying at least one feature installed in the movable object;
       receive at least one input by the user device to add a sensor to the movable object;
       determine a user device feature corresponding to the at least one input to support the sensor;
       determine that the user device feature is supported by the onboard data manager based on the feature list; and
       in response to determining that the user device feature is supported, send a first instruction corresponding to the at least one input to the movable object including the onboard data manager, wherein the first instruction is to subscribe to data from the sensor, wherein one or more sensor packets that include the data embedded in the body of the one or more sensor packets are obtained from the movable object to the user device in response to the subscription of the data from the sensor, and wherein the data extracted from the body of the one or more sensor packets is used by the user device to control movement of the movable object.

2. The system of claim 1, wherein a plurality of instructions are stored in a queue by the device data manager to be sent to the movable object.

3. The system of claim 2, wherein the device data manager is further configured to determine to process the first instruction from the queue and send a plurality of flight control instructions to the flight controller.

4. The system of claim 3, wherein the device data manager is further configured to determine that a second instruction from the queue is to be processed by the onboard data manager, and send the second instruction to the onboard data manager.

5. The system of claim 1, wherein the plurality of movable object features include an onboard sensor interface configured to interface with the at least one sensor and the plurality of user device features include a corresponding user device sensor driver configured to interface with an onboard sensor driver.

6. The system of claim 1, wherein the at least one input is to add a new feature to the at least one movable object, wherein the at least one input to add the new feature to the at least one movable object comprises uploading a movable object feature corresponding to the new feature to the movable object.

7. A method for communicating instructions in a movable object environment, comprising:
   identifying, by a data manager on a user device, an onboard data manager on a movable object, the movable object communicatively coupled to the user device;
   receiving a feature list from the onboard data manager by the data manager on the user device, the feature list identifying at least one feature installed in the movable object;
   receiving, by the data manager on the user device, at least one input by the user device to add a sensor to the movable object;
   determining, by the data manager on the user device, a user device feature corresponding to the at least one input;
   determining, by the data manager on the user device, that the user device feature is supported by the onboard data manager based on the feature list; and
   in response to determining that the user device feature is supported, sending, by the data manager on the user device, a first instruction corresponding to the at least one input to the movable object including the onboard data manager, wherein the first instruction is to subscribe, by the data manager, to data from the sensor, wherein one or more sensor packets that include the data embedded in the body of the one or more sensor packets are obtained from the movable object to the user device in response to the subscription of the data from the sensor, and wherein the data extracted from the body of the one or more sensor packets is used by the user device to control movement of the movable object.

8. The method of claim 7, further comprising:
   determining, by the data manager, that a second instruction is not supported by the onboard data manager based on the feature list; and
   in response to determining that the second instruction is not supported by the onboard data manager, sending the second instruction to a flight controller at the movable object.

9. The method of claim 7, wherein determining that the user device feature is supported by the onboard data manager comprises:
identifying, on the feature list, a feature corresponding to the user device feature;
comparing version data associated with the corresponding feature and the user device feature; and
determining that the version data matches.

10. The method of claim 7, further comprising:
identifying a second feature corresponding to the at least one input;
identifying a second corresponding feature on the feature list;
comparing version data associated with the corresponding feature and the user device feature;
determining that the version data does not match;
requesting an updated second feature from a server; and
uploading the updated second feature to the onboard data manager.

11. The method of claim 7, wherein the at least one feature includes an onboard sensor interface configured to interface with the sensor and the user device feature includes a corresponding user device sensor driver configured to interface with an onboard sensor driver.

12. The method of claim 7, wherein the at least one input is to add a new feature to the movable object.

13. The method of claim 12, wherein the at least one input to add the new feature to the movable object comprises uploading a movable object feature corresponding to the new feature to the movable object.

14. A non-transitory computer readable storage medium including instructions stored thereon which, when executed by one or more processors, cause the one or more processors to:
identify, by a data manager on a user device, an onboard data manager on a movable object, the movable object communicatively coupled to the user device;
receive a feature list from the onboard data manager, by the data manager on the user device, the feature list identifying at least one feature installed in the movable object;
receive, by the data manager on the user device, at least one input by the user device to add a sensor to the movable object;
determine, by the data manager on the user device, a user device feature corresponding to the at least one input;
determine, by the data manager on the user device, that the user device feature is supported by the onboard data manager based on the feature list; and
in response to determining that the user device feature is supported, send, by the data manager on the user device, a first instruction corresponding to the at least one input to the movable object including the onboard data manager, wherein the first instruction is to subscribe to data from the sensor, wherein one or more sensor packets that include the data embedded in the body of the one or more sensor packets are obtained from the movable object to the user device in response to the subscription of the data from the sensor, and wherein the data extracted from the body of the one or more sensor packets is used by the user device to control movement of the movable object.

15. The non-transitory computer readable storage medium of claim 14, wherein the instructions, when executed, further cause the one or more processors to:
determine, by the data manager, that a second instruction is not supported by the onboard data manager based on the feature list; and
in response to determining that the second instruction is not supported by the onboard data manager, send the second instruction to a flight controller at the movable object.

16. The non-transitory computer readable storage medium of claim 14, wherein the instructions to determine that the user device feature is supported by the onboard data manager, when executed, further cause the one or more processors to:
identify, on the feature list, a feature corresponding to the user device feature;
compare version data associated with the corresponding feature and the user device feature; and
determine that the version data matches.

17. The non-transitory computer readable storage medium of claim 14, wherein the instructions, when executed, further cause the one or more processors to:
identify a second feature corresponding to the at least one input;
identify a second corresponding feature on the feature list;
comparing version data associated with the corresponding feature and the user device feature;
determine that the version data does not match;
request an updated second feature from a server; and
upload the updated second feature to the onboard data manager.

18. The non-transitory computer readable storage medium of claim 14, wherein at least one feature includes an onboard sensor interface configured to interface with the sensor and the user device feature includes a corresponding user device sensor driver configured to interface with an onboard sensor driver.

19. The non-transitory computer readable storage medium of claim 14, wherein the at least one input is to add a new feature to the movable object, and wherein the at least one input to add the new feature to the movable object comprises uploading a movable object feature corresponding to the new feature to the movable object.

20. The system of claim 1, wherein the feature list is identified by an identifier associated with the onboard data manager or the movable object.

21. The system of claim 1, wherein where a sensor packet includes a command identifier and a sequence number.

* * * * *